(12) United States Patent
Ma et al.

(10) Patent No.: US 10,291,827 B2
(45) Date of Patent: May 14, 2019

(54) ADVANCED SCREEN CONTENT CODING SOLUTION

(71) Applicant: Futurewei Technologies Inc., Plano, TX (US)

(72) Inventors: Zhan Ma, Fremont, CA (US); Wei Wang, San Jose, CA (US); Haoping Yu, Carmel, IN (US); Xian Wang, Cupertino, CA (US); Jing Ye, San Jose, CA (US)

(73) Assignee: Futurewei Technologies, Inc., Plano, TX (US)

(*) Notice: Subject to any disclaimer, the term of this patent is extended or adjusted under 35 U.S.C. 154(b) by 0 days.

(21) Appl. No.: 14/549,405

(22) Filed: Nov. 20, 2014

(65) Prior Publication Data

US 2015/0146976 A1 May 28, 2015

Related U.S. Application Data

(60) Provisional application No. 61/907,903, filed on Nov. 22, 2013.

(51) Int. Cl.
| | |
|---|---|
| G06K 9/00 | (2006.01) |
| H04N 1/64 | (2006.01) |
| G06T 9/00 | (2006.01) |
| H04N 19/70 | (2014.01) |
| H04N 19/593 | (2014.01) |

(Continued)

(52) U.S. Cl.
CPC .............. H04N 1/646 (2013.01); G06T 9/00 (2013.01); H04N 19/593 (2014.11); H04N 19/70 (2014.11); H04N 19/157 (2014.11); H04N 19/174 (2014.11); H04N 19/176 (2014.11); H04N 19/186 (2014.11); H04N 19/503 (2014.11); H04N 19/93 (2014.11); H04N 2201/0089 (2013.01)

(58) Field of Classification Search
None
See application file for complete search history.

(56) References Cited

U.S. PATENT DOCUMENTS

| | | | | |
|---|---|---|---|---|
| 4,620,233 A | * | 10/1986 | Ogawa | .............. G06T 9/005 |
| | | | | 358/426.13 |
| 5,463,702 A | | 10/1995 | Trueblood | |

(Continued)

FOREIGN PATENT DOCUMENTS

| | | |
|---|---|---|
| CN | 102611888 A | 7/2012 |
| CN | 105745671 A | 7/2016 |

(Continued)

OTHER PUBLICATIONS

Foreign Communication From a Counterpart Application, New Zealand Application No. P41870NZ00, New Zealand Office Action dated Aug. 29, 2016, 7 pages.

(Continued)

*Primary Examiner* — Andrew M Moyer

(74) *Attorney, Agent, or Firm* — FutureWei Technologies, Inc.

(57) ABSTRACT

A method and device for coding screen content into a bitstream by selecting a color palette table for a coding unit (CU) of screen content, creating a color index map having indices for the coding unit (CU), and encoding the selected color palette table and the color index map for the CU into a bitstream.

26 Claims, 11 Drawing Sheets

(51) Int. Cl.

| | |
|---|---|
| H04N 19/503 | (2014.01) |
| H04N 19/93 | (2014.01) |
| H04N 19/176 | (2014.01) |
| H04N 19/186 | (2014.01) |
| H04N 19/157 | (2014.01) |
| H04N 19/174 | (2014.01) |

(56) References Cited

U.S. PATENT DOCUMENTS

| | | | |
|---|---|---|---|
| 5,848,195 A | 12/1998 | Joseph et al. | |
| 5,930,390 A * | 7/1999 | Coelho | G06T 9/005 |
| | | | 382/168 |
| 6,522,783 B1 * | 2/2003 | Zeng | H04N 1/644 |
| | | | 341/107 |
| 6,597,812 B1 * | 7/2003 | Fallon | H03M 7/3088 |
| | | | 341/51 |
| 7,162,077 B2 | 1/2007 | Li | |
| 7,343,037 B1 | 3/2008 | Kadatch | |
| 2002/0101536 A1 * | 8/2002 | Cook | H04N 9/641 |
| | | | 348/453 |
| 2003/0048943 A1 * | 3/2003 | Ishikawa | G06T 9/005 |
| | | | 382/166 |
| 2003/0076993 A1 | 4/2003 | Li | |
| 2003/0169932 A1 | 9/2003 | Li | |
| 2003/0202697 A1 * | 10/2003 | Simard | H04N 1/403 |
| | | | 382/195 |
| 2005/0276489 A1 | 12/2005 | Ishikawa | |
| 2006/0071939 A1 | 4/2006 | Khouzam et al. | |
| 2007/0083546 A1 | 4/2007 | Minamino et al. | |
| 2007/0116370 A1 | 5/2007 | Smirnov | |
| 2007/0171489 A1 | 7/2007 | Oyanagi et al. | |
| 2007/0188514 A1 * | 8/2007 | Li | H04N 9/64 |
| | | | 345/604 |
| 2007/0195369 A1 | 8/2007 | McDowell et al. | |
| 2007/0280295 A1 | 12/2007 | Uchimura | |
| 2008/0152221 A1 | 6/2008 | Kadatch | |
| 2008/0310740 A1 | 12/2008 | Strom et al. | |
| 2009/0010533 A1 | 1/2009 | Hung | |
| 2009/0214138 A1 | 8/2009 | Liao | |
| 2010/0220937 A1 * | 9/2010 | Furbeck | H04N 19/147 |
| | | | 382/246 |
| 2010/0329548 A1 | 12/2010 | Yoshimura | |
| 2011/0243471 A1 * | 10/2011 | Alshina | H04N 19/48 |
| | | | 382/248 |
| 2012/0275697 A1 | 7/2012 | McDowell et al. | |
| 2013/0114893 A1 | 5/2013 | Alakuijala | |
| 2013/0129237 A1 * | 5/2013 | Yie | G06T 9/004 |
| | | | 382/233 |
| 2013/0148721 A1 | 6/2013 | Chen et al. | |
| 2013/0272419 A1 | 10/2013 | Song et al. | |
| 2014/0078342 A1 | 3/2014 | Li et al. | |
| 2014/0147040 A1 | 5/2014 | Tanaka et al. | |
| 2014/0301475 A1 * | 10/2014 | Guo | H04N 19/50 |
| | | | 375/240.24 |
| 2015/0016501 A1 | 1/2015 | Guo et al. | |
| 2015/0146976 A1 | 5/2015 | Ma et al. | |
| 2015/0186100 A1 | 7/2015 | Tsai et al. | |
| 2015/0264363 A1 | 9/2015 | Pu et al. | |
| 2015/0264365 A1 | 9/2015 | Tsai et al. | |
| 2015/0271505 A1 | 9/2015 | Ma et al. | |
| 2015/0281688 A1 | 10/2015 | Yie et al. | |
| 2016/0277760 A1 * | 9/2016 | Li | H04N 19/61 |

FOREIGN PATENT DOCUMENTS

| | | |
|---|---|---|
| CN | 105900432 A | 8/2016 |
| CN | 106030651 A | 10/2016 |
| EP | 1104176 A2 | 5/2001 |
| KR | 20080106185 A | 12/2008 |
| RU | 2407222 C2 | 12/2010 |
| WO | 2009002603 A1 | 12/2008 |
| WO | 2011068360 A2 | 6/2011 |
| WO | 2013046096 A1 | 4/2013 |
| WO | 2015054812 A1 | 4/2015 |
| WO | 2015077720 A1 | 5/2015 |
| WO | 2015103496 A2 | 7/2015 |

OTHER PUBLICATIONS

Ivanov, D., et al., "Color Distribution—a new approach to texture compression," Computer Graphics Forum, vol. 19, No. 3, Aug. 21, 2000, 8 pages.

Lin, T., "Mixed Chroma Sampling-rate coding: combining the merits of 4:4:4 and 4:2:0 and increasing the value of past 4:2:0 investment," Joint Collaborative Team on Video Coding (JCT-VC) of ITU-T SG16 WP3 and ISO/IEC JTC1/SC29/WG11, JCTVC-H0065, Feb. 1-10, 2012, 5 pages.

Guo, L., et al., "Color Palette for Screen Content Coding," IEEE International Conference on Image Processing, Oct. 2014, pp. 5556-5560.

Foreign Communication From a Counterpart Application, European Application No. 14864463.6, Extended European Search Report dated Sep. 21, 2016, 12 pages.

Lan, C., et al., "Compress Compound Images in H.264/MPGE-4 AVC by Exploiting Spatial Correlation," IEEE Transactions on Image Processing, vol. 19, No. 4, Apr. 2010, pp. 946-957.

Guo, L., et al., "Palette Mode for Screen Content Coding," JCTVC-M0323, Apr. 18-26, 2013, 12 pages.

Xu, J., et al., "Non-RCE3: base color merging for MBCIM," JCTVC-N0235, Jul. 25-Aug. 2, 2013, 8 pages.

Foreign Communication From a Counterpart Application, Japanese Application No. 2016-533032, Japanese Office Action dated Jun. 2, 2017, 5 pages.

Foreign Communication From a Counterpart Application, Japanese Application No. 2016-533032, English Translation of Japanese Office Action dated Jun. 2, 2017, 6 pages.

Chaumont, M., et al., "A 8-Bit-Grey-Level Image Embedding ITS 512 Color Palette," EURASIP, 16th European Signal Processing Conference, Dec. 19, 2008, 6 pages.

Ma, Z., et al., "Advanced Screen Content Coding Using Color Table and Index Map," XP011558255, vol. 23, No. 10, Oct. 2014, pp. 4399-4412.

Lan, C., et al., "Intra and inter coding tools for screen contents," JCTVC-E145, Mar. 16-23, 2011, 12 pages.

Sullivan, G.J., et al., "Standardized Extensions of High Efficiency Video Coding (HEVC)," TR2013-105, Oct. 2013, 19 pages.

Zhu, W., et al., "Template-based palette prediction," XP30114648, JCTVC-N0169, Apr. 18-26, 2013, 8 pages.

Chen, J., et al., "Description of screen content coding technology proposal by Qualcomm," XP30115915, JCTVC-Q0031, Mar. 27-Apr. 4, 2014, 18 pages.

Chen, C., et al., "Description of screen content coding technology proposal by NCTU and ITRI International," XP30115917, JCTVC-Q0032, Mar. 27-Apr. 4, 2014, 26 pages.

Lai, P., et al., "Description of screen content coding technology proposal by MediaTek," XP30115919, JCTVC-Q0033, Mar. 27-Apr. 4, 2014, 32 pages.

Ma, Z., et al., "Description of screen content coding technology proposal by Huawei Technologies, Inc," XP30115921, JCTVC-Q0034, Mar. 27-Apr. 4, 2014, 14 pages.

Ma, Z., et al., "Description of screen content coding technology proposal by Huawei," XP30115922, JCTVC-Q0034-r1, Mar. 27-Apr. 4, 2014, 22 pages.

Xiu, X., et al., "Description of Screen Content Coding Technology Proposal by InterDigital," XP030115927, JCTVC-Q0037, Mar. 27-Apr. 4, 2014, 30 pages.

Zhu, J., et al., "AHG10: Modified copy above mode for palette based coding," XP030116122, JCTVC-Q0174, Mar. 27-Apr. 4, 2014, 3 pages.

Wang, W., et al., "AHG8: String match in coding of screen content," XP30116125, JCTVC-Q0176-r1, Mar. 27-Apr. 4, 2014, 12 pages.

Huang, Y., et al., "Description of Screen Content Core Experiment 3 (SCCE3): Palette mode," XP030116244, JCTVC-Q1123, Mar. 27-Apr. 4, 2014, 11 pages.

(56) References Cited

OTHER PUBLICATIONS

Foreign Communication From a Counterpart Application, European Application No. 15764799.1, Extended European Search Report dated Jan. 23, 2017, 18 pages.
Foreign Communication From a Counterpart Application, European Application No. 15795914.9, Extended European Search Report dated Jul. 8, 2016, 10 pages.
Foreign Communication From a Counterpart Application, PCT Application No. PCT/CN2015/079635, International Search Report dated Jul. 28, 2015, 7 pages.
Foreign Communication From a Counterpart Application, PCT Application No. PCT/CN2015/079635, Written Opinion dated Jul. 28, 2015, 4 pages.
Foreign Communication From a Counterpart Application, PCT Application No. PCT/US2015/021797, International Search Report dated Jul. 29, 2015, 3 pages.
Foreign Communication From a Counterpart Application, PCT Application No. PCT/US2015/021797, Written Opinion dated Jul. 29, 2015, 5 pages.
Foreign Communication From a Counterpart Application, Russian Application No. 2016124544, Russian Search Report dated Aug. 31, 2017, 2 pages.
Foreign Communication From a Counterpart Application, Russian Application No. 2016124544, English Translation of Russian Search Report dated Aug. 31, 2017, 2 pages.
Foreign Communication From a Counterpart Application, Russian Application No. 2016124544, Russian Office Action dated Sep. 4, 2017, 5 pages.
Foreign Communication From a Counterpart Application, Russian Application No. 2016124544, English Translation of Russian Office Action dated Sep. 4, 2017, 3 pages.
Foreign Communication From a Counterpart Application, European Application No. 15764799.1, Partial Supplementary European Search Report dated Sep. 12, 2016, 10 pages.
Foreign Communication From a Counterpart Application, Japanese Application No. 2016-533032, Japanese Office Action dated Oct. 3, 2017, 3 pages.
Foreign Communication From a Counterpart Application, Japanese Application No. 2016-533032, English Translation of Japanese Office Action dated Oct. 3, 2017, 2 pages.
Foreign Communication From a Counterpart Application, New Zealand Application No. P41870NZ00, New Zealand Office Action dated Jul. 25, 2017, 7 pages.
Foreign Communication From a Counterpart Application, PCT Application No. PCT/US14/67155, International Search Report dated Mar. 10, 2015, 10 pages.
Office Action dated Jun. 15, 2017, 31 pages, U.S. Appl. No. 14/664,284, filed Mar. 20, 2015.
Office Action dated Jun. 22, 2017, 7 pages, U.S. Appl. No. 14/719,064, filed May 21, 2015.
Office Action dated Sep. 28, 2017, 17 pages, U.S. Appl. No. 14/719,064, filed May 21, 2015.
Sullivan, G., et al., "Overview of the High Efficiency Video Coding (HEVC) Standard," IEEE Transactions on Circuits and Systems for Video Technology, vol. 22, No. 12, Dec. 2012, pp. 1649-1668.
Foreign Communication From a Counterpart Application, Chinese Application No. 201580016913.5, Chinese Search Report dated Dec. 28, 2017, 7 pages.
Office Action dated Dec. 22, 2017, 27 pages, U.S. Appl. No. 14/664,284, filed Mar. 20, 2015.
Machine Translation and Abstract of Chinese Publication No. CN105900432, Aug. 24, 2016, 13 pages.
Foreign Communication From A Counterpart Application, Chinese Application No. 201580016913.5, Chinese Search Report dated Apr. 10, 2018, 3 pages.
Foreign Communication From A Counterpart Application, Chinese Application No. 201580016913.5, Chinese Office Action dated Apr. 18, 2018, 9 pages.
Machine Translation and Abstract of Chinese Publication No. CN102611888, Jul. 25, 2012, 8 pages.
Foreign Communication From A Counterpart Application, Chinese Application No. 201580009874.6, Chinese Search Report dated Apr. 20, 2018, 8 pages.
Sullivan G J et al: "Meeting Report of 14th JCT-VC Meeting",14. JCT-VC Meeting; Jul. 25, 2013-Feb. 8, 2013; Vienna; JCTVC-N1000, Oct. 23, 2013, XP030114945, 207 pages.
Guo L et al: "RCE3: Results of Test 11 on Palette Mode for Screen Gontent Coding", 14. JCT-VC Meeting; JCTVC-N0247, Jul. 16, 2013, XP030114764, 7 pages.
Flynn D et al: "BoG report on Range Extensions topics",15. JCT-VC Meeting; JCTVC-O0352-v5, Nov. 1, 2013 , XP030115433, 49 pages.
Guo X et al: "AHG8: Mayor-color-based screen content coding",15. JCT-VC Meeting; JCTVC-SITEI, No. JCTVC-O0182-v3, Oct. 25, 2013, XP030115219, 10 pages.

\* cited by examiner

| FIG. 3A | FIG. 3B |

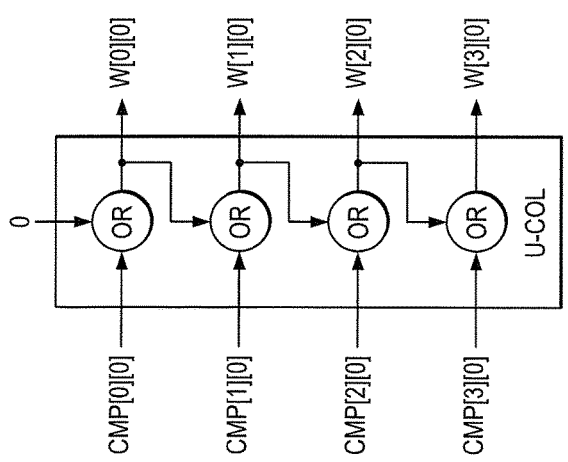

ADVANCED SCREEN CONTENT CODING SOLUTION

CLAIM OF PRIORITY

This application claims priority of U.S. Provisional Patent Application Ser. No. 61/907,903, filed on Nov. 22, 2013, entitled "ADVANCED SCREEN CONTENT CODING SOLUTION" the teachings which are incorporated herein by reference.

TECHNICAL FIELD

The present disclosure is generally directed to screen content coding.

BACKGROUND

Screen content coding imposes new challenges for video compression technology because of its distinct signal characteristics compared with conventional natural videos. There appear to be a few promising techniques for the advanced screen content coding, e.g., pseudo string match, color palette coding, and intra motion compensation or intra block copy.

Among these techniques, pseudo string match shows the highest gain for lossless coding, but with significant complexity overhead and difficulties on lossy coding mode. The color palette coding is developed for screen content under the assumption that non-camera captured content typically contains a limited few distinct colors, rather than the continuous color tone in natural videos. Even though the pseudo string match and color palette coding methods showed great potential, intra motion compensation or intra block copy was adopted into the working draft (WD) version 4 and reference software of on-going HEVC range extension (HEVC RExt) for screen content coding. This is mainly due to the fact that the motion estimation and compensation approach has been studied extensively over decades, as well as its idea and practical implementation is fairly easy (especially for hardware).

However, the coding performance of intra block copy is bounded because of its fixed block structure partitions. On the other hand, performing block matching, something similar to motion estimation in intra picture, also brings up the encoder complexity significantly on both computing and memory access.

SUMMARY

This disclosure is directed to an advanced screen content coding solution.

In one example embodiment, a method for coding screen content into a bitstream selects a color palette table for a coding unit (CU) of screen content. The color palette table created for the CU and a color palette table is created for a neighboring CU. A color index map is created having indices for the coding unit (CU) of the screen content using the selected color palette table. The selected color palette table and the color index map are encoded/compressed for each of a plurality of CUs into a bitstream.

BRIEF DESCRIPTION OF THE FIGURES

For a more complete understanding of the present disclosure, and the advantages thereof, reference is now made to the following descriptions taken in conjunction with the accompanying drawings, wherein like numbers designate like objects, and in which:

FIG. 11 illustrates a U_COL module;

FIG. 12 illustrates a U_2D_BLOCK module;

FIG. 13 is an illustration of horizontal and vertical scan for index map processing of a exemplified CU;

DETAILED DESCRIPTION

In this disclosure, an advanced screen content coding solution is described that outperforms a High-Efficiency Video Coding (HEVC) range extension (such as HEVC Version 2 or HEVC RExt). This new solution includes several algorithms that are designed specifically for coding screen content. These algorithms include pixel representation using a color palette or a color table, referred to herein as a color palette table, color palette compression, color index map compression, string search, and residual compression. This technology is developed, harmonized, and can be integrated with the HEVC range extension (RExt) and future HEVC extensions to support efficient screen content coding. However, this technology could be implemented with any existing video standards. For simplicity, HEVC RExt is used as an example in the description below, and HEVC RExt software is used to describe and demonstrate the compression efficiency. This solution is integrated as an additional mode by using a color palette table and index map, defined herein as a color palette mode, in HEVC to demonstrate the performance.

Figure 1:
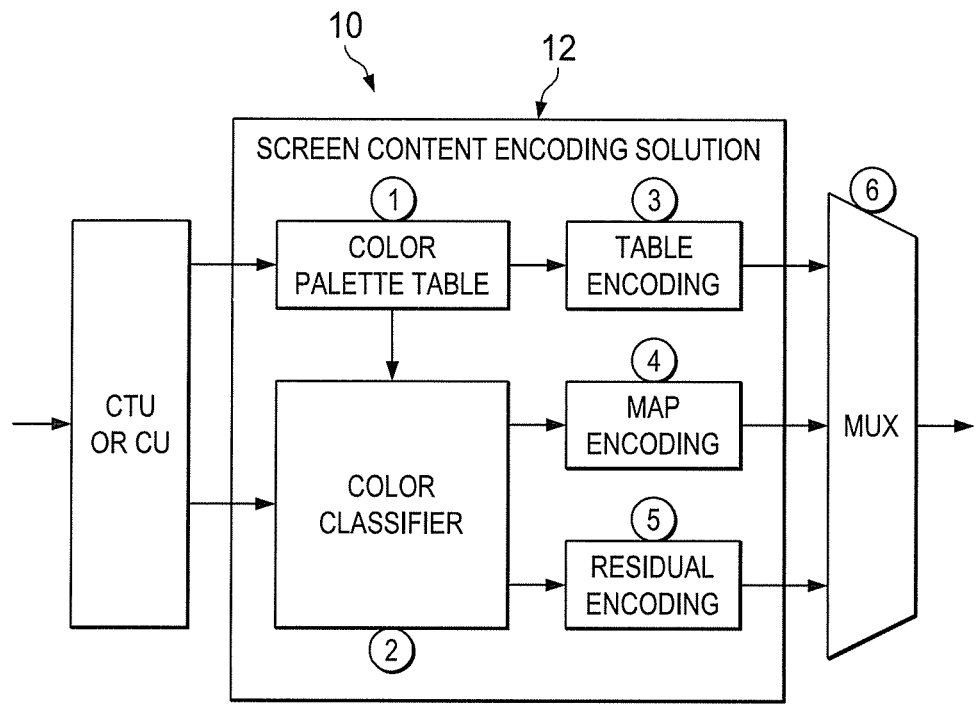
FIG. 1 illustrates a screen content encoding solution using color palette table and index map mode or palette mode according to one example embodiment of this disclosure.
Figure 2:
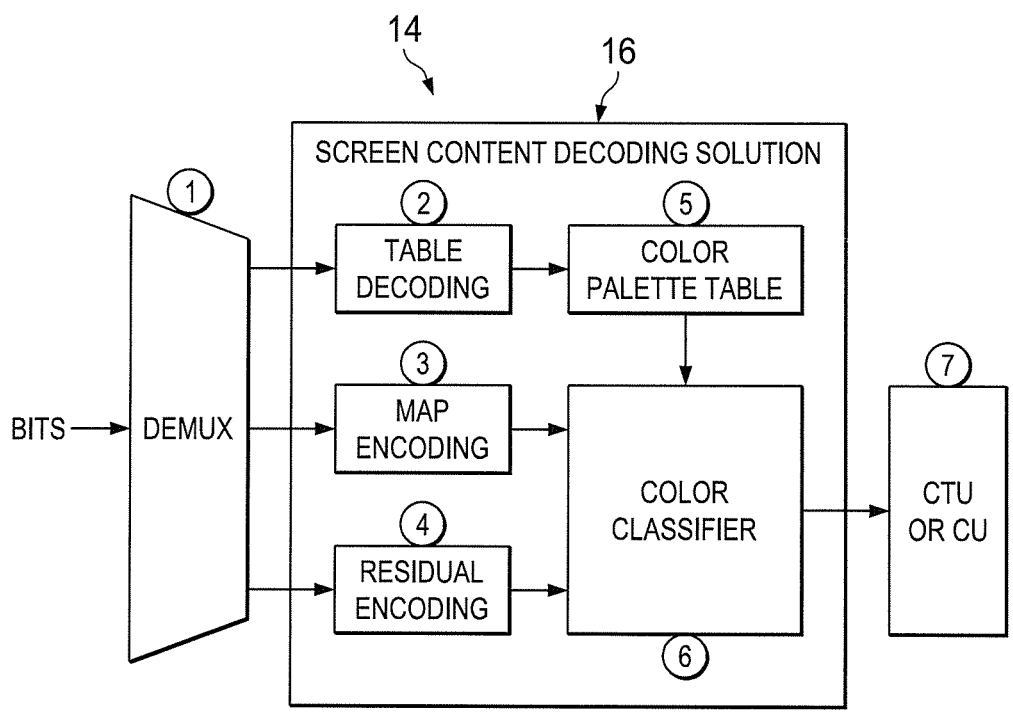
FIG. 2 illustrates a screen content decoding solution for color palette table and index map mode or palette mode.
Figures 3, 3A:
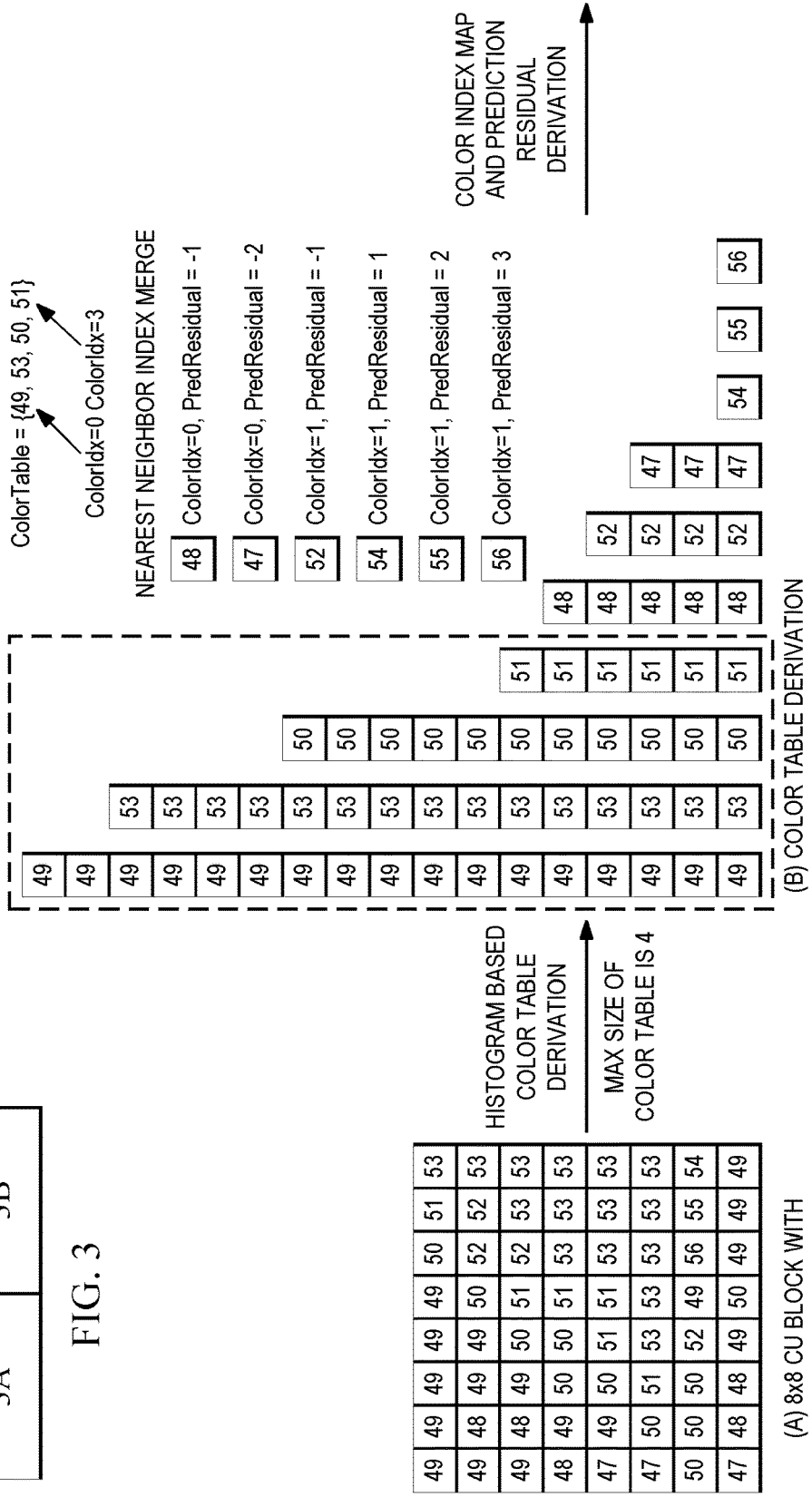
FIG. 3 illustrates a process or workflow of the screen content solution for this color palette table and index map mode or palette mode of a CU.
Figure 3B:
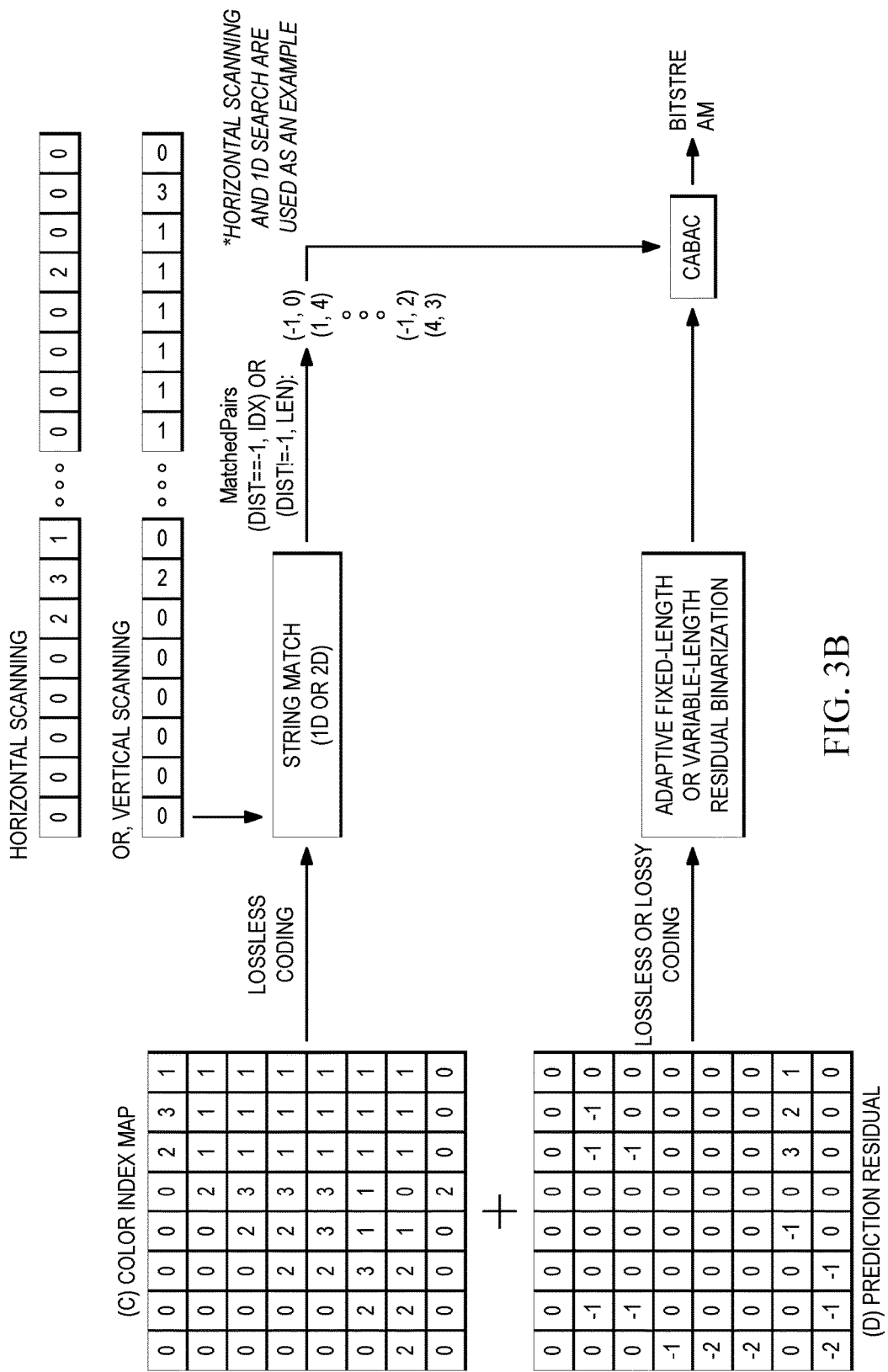

The concept and description of this disclosure is illustrated in the Figures. FIG. 1 shows an encoder 10 having a processor 12 including memory, and FIG. 2 shows a decoder 14 having a processor 16 and memory, together illustrating an example embodiment of an encoding and decoding solution for the color palette mode, respectively, in accordance with this disclosure. As shown, the encoder 10 and decoder 14 each comprise a processor and memory and form a codec solution. The codec solution includes the processor 12 of encoder 10 executing new algorithms or methods including Process 1 creating a Color Palette Table, Process 2 classifying colors or pixel values using a previously derived color palette table corresponding color indices, Process 3 encoding the Color Palette Table, Process 4 encoding the color index map, Process 5 encoding the residuals, and Process 6 writing new syntax elements into the compressed bitstream. Processor 16 of decoder 14 executes new algorithms or methods including the reverse steps. FIG. 3 provides a process or workflow of the screen content solution according to this disclosure.

Basically, a high-efficiency color palette compression method (CPC) is performed on each coding unit (CU). A coding unit is a basic operating unit in HEVC and HEVC RExt, which is a squared block of pixels consisting of three components (i.e., RGB, or YUV, or XYZ).

At each CU level, the CPC method includes two major steps. First, the processor 12 derives or generates a color palette table in the first step. This table is ordered according to a histogram (i.e., occurrence frequency of each color value), or its actual color intensity, or any arbitrary method in order to increase the efficiency of the following encoding process. Based on the derived color palette table, each pixel in the original CU is converted to its color index within the color palette table. A contribution of this disclosure is technology to efficiently encode, such as using compression, the color palette table and the color index map of each CU into the stream. At the receiver side, the processor 16 parses the compressed bitstream to reconstruct, for each CU, the complete color palette table and the color index map, and then further derive the pixel value at each position by combing the color index and color palette table.

In an illustrative example of this disclosure, assume a CU with N×N pixels (N=8, 16, 32, 64 for compatibility with HEVC). The CU typically contains three chrominance (chroma) components (i.e., G, B, R, or Y, Cb, Cr, or X, Y Z) at a different sampling ratio (i.e., 4:4:4, 4:2:2, 4:2:0). For simplicity, sequences of 4:4:4 are illustrated in the disclosure. For sequences of 4:2:2 and 4:2:0 videos, chroma upsampling could be applied to obtain the 4:4:4 sequences, or each color component could be processed independently. Then, the same procedure described in this disclosure can be applied. For 4:0:0 monochrome videos, this can be treated as an individual plane of 4:4:4 without other two planes. All methods for 4:4:4 can be applied directly.

Packed or Planar

Figure 4:
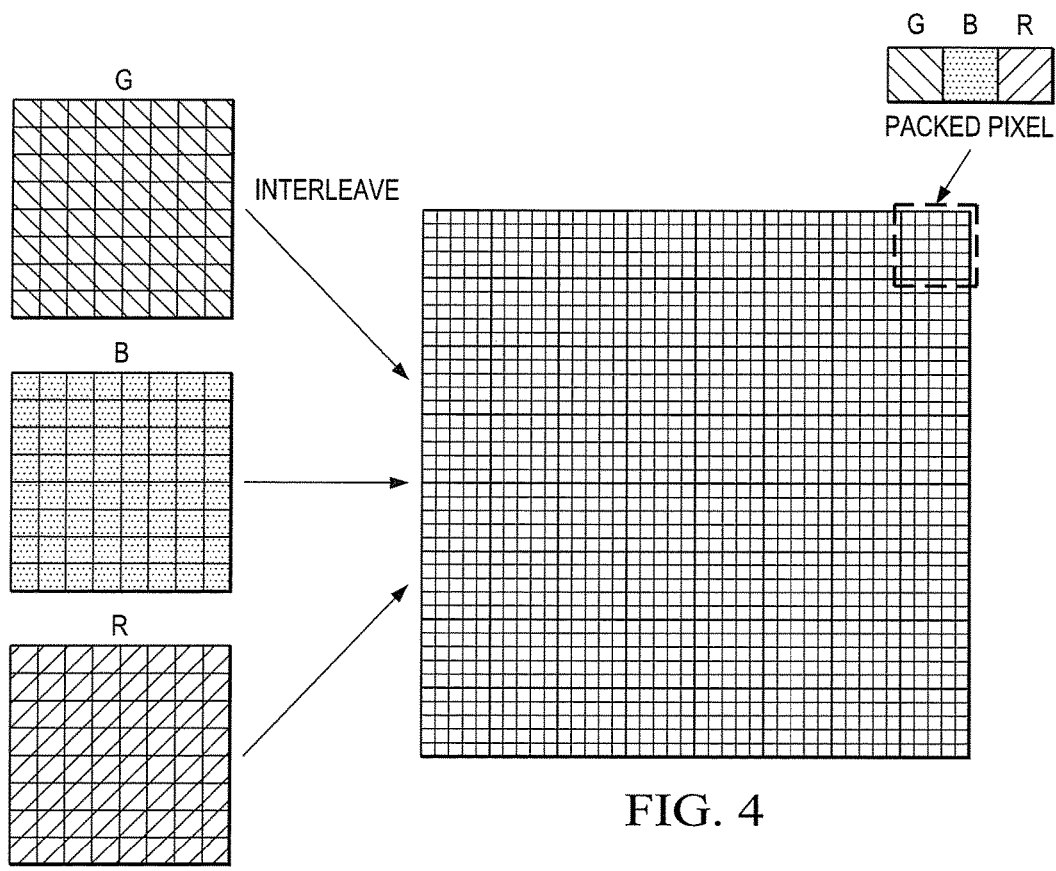
FIG. 4 illustrates a conventional G, B, R in planar mode (left) to Packed mode (right)

This method is shown for the Block CTU or CU in FIG. 1. First of all, a flag is defined, called the enable_packed_component_flag, for each CU to indicate whether the current CU is processed using packed fashion or conventional planar mode (i.e., G, B, R or Y, U, V components are processed independently). FIG. 4 illustrates a conventional G, B, R in planar mode (left) to Packed mode (right). YUV or other color format could be processed in the same fashion as exemplified for RGB content.

Both the packed mode and the planar mode have its own advantage and disadvantage. For instance, the planar mode supports parallel color component processing for G/B/R or Y/U/V. However, it might suffer the low coding efficiency. The packed mode can share the header information (such as the color palette table and index map in this disclosure) for this CU among different color components. However, it might break the parallelism. An easy way to decide whether the current CU should be encoded in the packed fashion is to measure rate distortion (R-D) cost. The enable_packed_component_flag is used to signal the encoding mode to the decoder explicitly.

In addition, to define the enable_packed_component_flag at the CU level for low-level handling, it can be duplicated in slice header or even sequence level (e.g., Sequence Parameter Set or Picture Parameter Set) to allow slice level or sequence level handling, depending on the specific application requirement.

Color Palette Table and Index Map Derivation

As shown in FIG. 1, for Processes 1 and 3, for each CU, pixel locations are transversed and the color palette table and index map for the subsequent processing is derived. Each distinct color is ordered in the color palette table, depending on either its histogram (i.e., frequency of occurrence), or its intensity, or any arbitrary method in order to increase the efficiency of the following encoding process. For example, if the encoding process uses a differential pulse-code modulation (DPCM) method to code the difference between adjacent pixels, the optimal coding result can be obtained if the adjacent pixels are assigned with adjacent color index in Color palette table.

After obtaining the color palette table, each pixel is mapped to the corresponding color index to form the index map of the current CU. The processing of index map is described in the subsequent section.

For a conventional planar CU, each color or chrominance component can have its individual color palette table, such as colorTable_Y, colorTable_U, colorTable_V or colorTable_R, colorTable_G, colorTable_B, naming a few here as an example. Meanwhile, the color palette table for a major component can be derived, such as Y in YUV or G in GBR, and shared for all components. Normally, by this sharing, other color components, other than Y or G, would have some mismatch relative to its original pixel colors from those shared in color palette table. The residual engine (such as HEVC coefficients coding methods) is then applied to encode those mismatched residuals. On the other hand, for a packed CU, a single color palette table is shared among all components.

A pseudo code is provided to exemplify the color palette table and index map derivation as follows:

```
deriveColorTableIndexMap( )
{
    deriveColorTable( );
    deriveIndexMap( );
}
    deriveColorTable(src, cuWidth, cuHeight, maxColorNum)
    {
        // src - input video source in planar or packed
mode
        // cuWidth, cuHeight - width and height of current
CU
        /* maxColorNum - max num of colors allowed in color
table*/
        /*transverse */
        //
        //          memset(colorHist, 0,
(1<<bitDepth)*sizeof(UINT))
        pos=0;
        cuSize=cuWidth*cuHeight;
        while (pos<cuSize) {
            colorHist[src[pos++]]++;
        }
        /*just pick non-zero entry in colorHist[ ] for color
```

-continued

```
intensity ordered table*/
    j=0;
    for(i=0;i<(1<<bitDepth);i++)
    {
        if(colorHist[i]!=0)
            colorTableIntensity[j++] = colorHist[i];
    }
    colorNum=j;
    /*quicksort for histgram*/
    colorTableHist = quickSort(colorTableIntensity, colorNum);
        /*if maxColorNum >= colorNum, all colors will be picked*/
        /*if maxColorNum < colorNum, only maxColorNum colors will be picked for      colorTableHist. In this case, all pixels will find its best matched color and corresponding index with difference (actual pixel and its corresponding color) coded by the residual engine.*/
        /*Best number of colors in color table could be determined by iterative R-D cost derivation!*/
}
deriveIndexMap( )
{
    pos=0;
    cuSize=cuWidth*cuHeight;
    while ( pos < cuSize)
    {
        minErr=MAX_UINT;
        for (i=0;i<colorNum;i++)
        {
            err = abs(src[pos] – colorTable[i]);
            if (err<minErr)
            {
                minErr = err;
                idx = i;
            }
        }
        idxMap[pos] = idx;
    }
}
```

Color Palette Table Processing

For Process 1 in FIG. 1, color palette table processing involves the processor 12 encoding of the size of a color palette table (i.e., the total number of distinct colors) and each color itself. A majority of the bits are consumed by the encoding of each color in a color palette table. Hence, focus is placed on the color encoding (or encoding of each entry in color palette table).

The most straightforward method to encode the colors in a color palette table is using the pulse-code modulation (PCM) style algorithm where each color is coded independently. Alternatively, the nearest prediction for a successive color can be applied, and then the prediction delta can be encoded rather than the default color intensity, which is DPCM (differential PCM) style. Both methods can be later entropy encoded using equal probability model or adaptive context model, depending on the trade-off between complexity costs and coding efficiency.

Here, another advanced scheme is disclosed, called a Neighboring Color palette table Merge, where a color_table_merge_flag is defined to indicate whether the current CU uses the color palette table from its left or upper CU. If not, the current CU will carry the color palette table signaling explicitly. For the merging process, another color_table_merge_direction indicates the merging direction either from upper or from left CU. Of course, the candidates could be more than current upper or left CU, e.g. upper-left, upper-right and etc. However, the upper and left CU are used in this disclosure to exemplify the idea. For any of which, each pixel is compared with the entries in an existing color palette table and assigned an index yielding the least prediction difference (i.e., pixel subtracts the closest color in color palette table) via deriveIdxMap( ). For the case where the prediction difference is non-zero, all these residuals are encoded using the HEVC RExt residual engine. Note that whether using the merging process or not can be decided by the R-D cost.

There are several ways to generate the neighboring color palette tables for being used in the merging process in coding the current CU. Depending on its implementation, one of them requires updating at both the encoder and the decoder and the other one is an encoder side process only.

Figure 5:
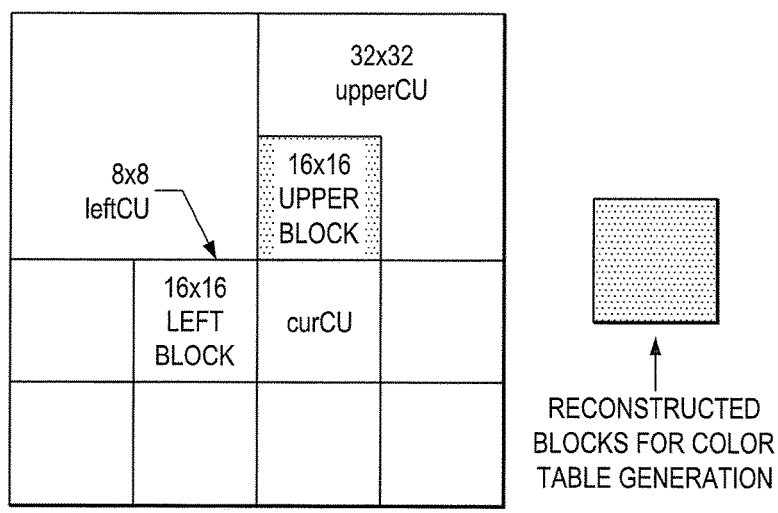
FIG. 5 illustrates color palette table re-generation using neighboring reconstructed blocks.

Updating at both the encoder and the decoder: In this method, the color palette table of neighbor CUs are generated upon the available reconstructed pixels, regardless of CU depth, size and etc. For each CU, the reconstructions are retrieved for its neighboring CU at the same size and same depth (assuming the color similarity would be higher in this case). For example, if a current CU is 16×16 with depth=2, no matter the partition of its neighboring CUs (for example 8×8 with depth=3 for left CU and 32×32 with depth=1 for upper CU), the pixel offset (=16) will be located from the current CU origin to the left to process the left 16×16 block and to the upper for the upper 16×16 block, as shown in the FIG. 5. Note that both the encoder and the decoder should maintain this process.

Constrained Encoder Only Process: for this method, the merging process occurs when a current CU shares the same size and depth as its upper and/or left CU. The color palette tables of the available neighbors are used to derive the color index map of the current CU for subsequent operations. For example, for a current 16×16 CU, if its neighboring CU, i.e., either upper or left placed, are encoded using the color palette table and index method, its color palette table is used for the current CU directly to derive the R-D cost. This merge cost is compared with the case that the current CU derives its color palette table explicitly (as well as other conventional modes existing in the HEVC or HEVC RExt). Whichever produces the less R-D cost is chosen as the final mode to be written into the output bit stream. As seen, only the encoder is required to experiment/simulate different potential modes. At the decoder side, the color_table_merge_flag and the color_table_merge_direction infer the merge decision and merge direction without requiring additional processing workload.

Color Index Map Processing

For Process 3 in FIG. 1, for coding the color index map, a few solutions have been studied, such as RUN mode, RUN and COPY ABOVE, and adaptive neighbor index prediction. In this disclosure, a 1D string matching approach and its 2D variation is disclosed to encode the index map coding. At each position, it finds its matched point and records the matched distance and length for a 1D string match, or width/height for a 2D string match. For an unmatched position, its index intensity, or delta value between its index intensity and predicted index intensity, is encoded directly.

Figure 6:
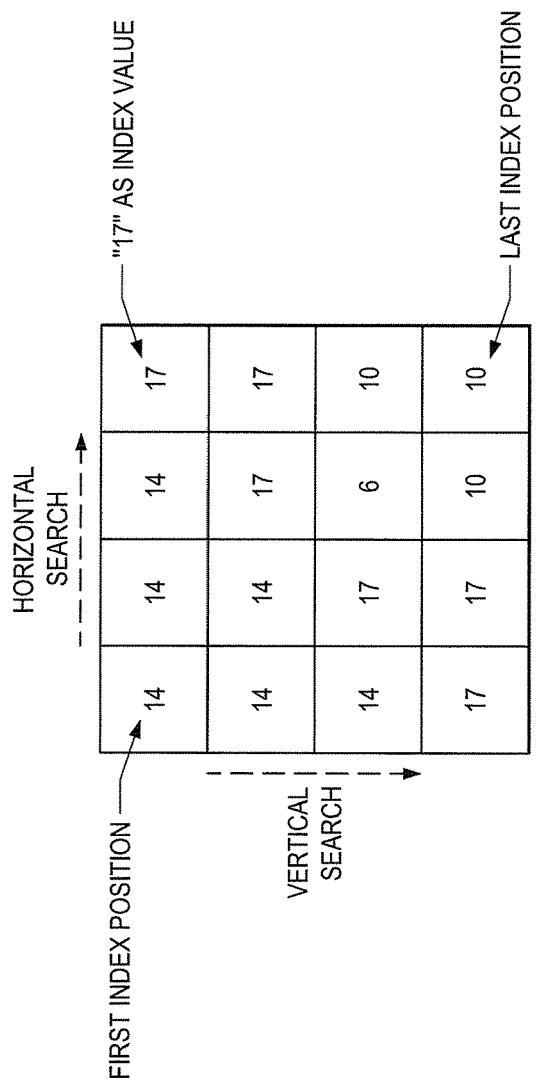
FIG. 6 illustrates an index map is parsed from a real word screen content.
Figure 7:
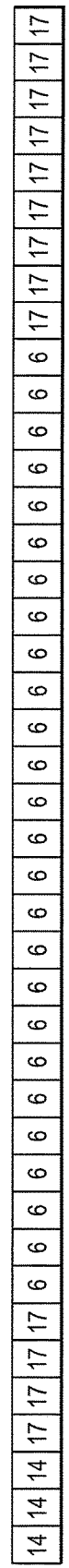
FIG. 7 illustrates a piece of a segment for a 1-D search after horizontal scanning.

Disclosed here is a straightforward ID search method over the color index map. Referring to FIG. 6, an index map is parsed from a real world screen content. FIG. 7 shows a piece of a segment after a 1-D search (i.e., just beginning of this index map).

On top of this 1-D color index vector, string match is applied. An example of this 1-D string match is given below. For the first position of each index map, such as 14 as shown in FIG. 7, since there is no buffered reference yet, this very first index is treated as the "unmatched pair", where it is given −1 and 1 to its corresponding distance and length, noted as (dist, len)=(−1, 1). For the $2^{nd}$ index, again another "14", it is the first index coded as reference, therefore the dist=1. Because there is another "14" at $3^{rd}$ position, the length is 2, i.e., len=2, (given the every proceed index could be served as the reference immediately for the subsequent index). Moving forward to the $4^{th}$ position, encountered is the "17" which has not been seen before. Hence, it is encoded as an unmatched pair again, i.e., (dist, len)=(−1, 1). For the unmatched pair, the flag is encoded (such as the "dist==−1") and followed by the real value of the index (like first appeared "14", "17", "6" and etc). On the other hand, for the matched pairs, the flag is still encoded (such as the "dist !=−1"), and followed by the length of the matched string.

Here is a summary for the encoding procedure using the exemplified index shown in FIG. 7.

```
dist = −1, len = 1, idx=14 (unmatched)
dist= 1, len = 2 (matched)
dist = −1, len = 1, idx=17 (unmatched)
dist= 1, len = 3 (matched)
dist = −1, len = 1, idx= 6 (unmatched)
dist= 1, len = 25 (matched)
dist= 30, len = 4 (matched) /*for the "17" which appeared before*/
... .
```

A pseudo code is given for this matched pair derivation, i.e.,

```
Void deriveMatchedPairs ( TComDataCU* pcCU, Pel* pIdx, Pel* pDist, Pel* pLen, UInt uiWidth, UInt uiHeight)
{
// pIdx is a idx CU bounded within uiWidth*uiHeight
UInt uiTotal = uiWidth*uiHeight;
UInt uiIdx = 0;
Int j = 0;
Int len = 0;
// first pixel coded as itself if there isn't left/upper buffer
pDist[uiIdx] = −1;
pLen[uiIdx] = 0;
uiIdx++;
while (uiIdx < uiTotal )
{
    len = 0;
    dist = −1;
    for ( j=uiIdx-1; j >= 0; j-- )
    {
        // if finding matched pair, currently exhaustive search is applied
        // fast string search could be applied
        if ( pIdx[j] == pIdx[uiIdx] )
        {
            for (len = 0; len < (uiTotal−uiIdx); len++
)
            {
                if ( pIdx[j+len] != pIdx[len+uiIdx]
)
                    break;
            }
            if ( len > maxLen ) /*better to change with R-D decision*/
            {
                maxLen = len;
                dist = (uiIdx − j );
            }
        }
        pDist[uiIdx] = dist;
        pLen[uiIdx] = maxLen;
        uiIdx = uiIdx + maxLen;
    }
}
```

The following steps are made when a 2D search variation is used:
1. Identify the location of current pixel and reference pixel as starting point,
2. Apply a horizontal 1D string match to the right direction of current pixel and reference pixel. Maximum search length is constrained by the end of current horizontal row. Record the maximum search length as right_width
3. Apply a horizontal 1D string match to the left direction of current pixel and reference pixel. Maximum search length is constrained by the beginning of current horizontal row. Record the maximum search length as left_width
4. Perform same 1D string match at next row, using pixels below current pixel and reference pixel as new current pixel and reference pixel
5. Stop until right_width==left_width==0.
6. Now for each height[n]={1, 2, 3 . . . }, there is a corresponding array of width[n] {{left_width[1], right_width[1]}, {left_width[2], right_width[2]}, {left_width[3], right_width[3]} . . . }
7. Define a new min width array {{lwidth[1], rwidth[1]}, {lwidth[2], rwidth[2]}, {lwidth[3], rwidth[3]} . . . } for each height [n], where lwidth[n]=min(leftwidth[1:n−1]), rwidth[n]=min(right_width[1:n−1])
8. A size array{size[1], size[2], size[3] . . . } is also defined, where size[n]=height[n]×(lwidth[n]+hwidth[n])
9. Assume size[n] holds the maximum value in size array, the width and height of 2D string match is selected using the corresponding {lwidth[n], rwidth[n], height[n]}

One way to optimize the speed of the 1D or 2D search is to use running hash. A 4-pixel running hash structure is described in this disclosure. A running hash is calculated for every pixel at horizontal direction to generate a horizontal hash array running_hash_h[ ]. Another running hash is calculated on top of running_hash_h[ ] to generate a 2D hash array running_hash_hv[ ]. Each value match in this 2D hash array represents a 4×4 block match. To perform a 2D match, as many as 4×4 block matches are to be found before performing pixel-wised comparison to their neighbors. Since pixel wised comparison is limited to 1-3 pixels, the search speed can be increased dramatically.

From the above description, the matched widths of each row are different from each other, thus each row has to be processed separately. To achieve efficiency and low complexity, a block based algorithm is disclosed, which can be used in both a hardware and software implementation. Much similar to standard motion estimation, this algorithm processes one rectangle block at a time.

Figure 8:
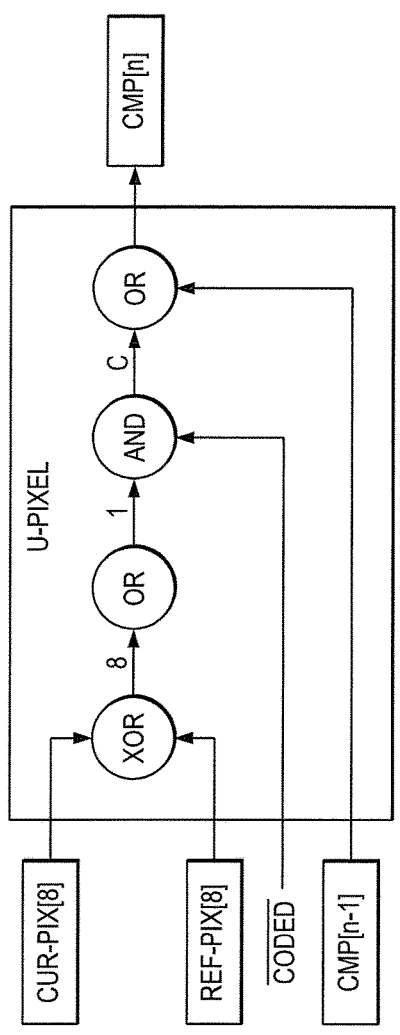
FIG. 8 illustrates a U_PIXEL module.

Take a 4×4 block as example. The basic unit in this design is called U_PIXEL, as shown in FIG. 8. The coded signal is a flag that indicates if the reference pixel has already been encoded from previous string match operation. Optionally, the input signal Cmp[n−1] can be forced to "0", which allows removal of the last "OR" gate from U_PIXEL module.

Figure 9:
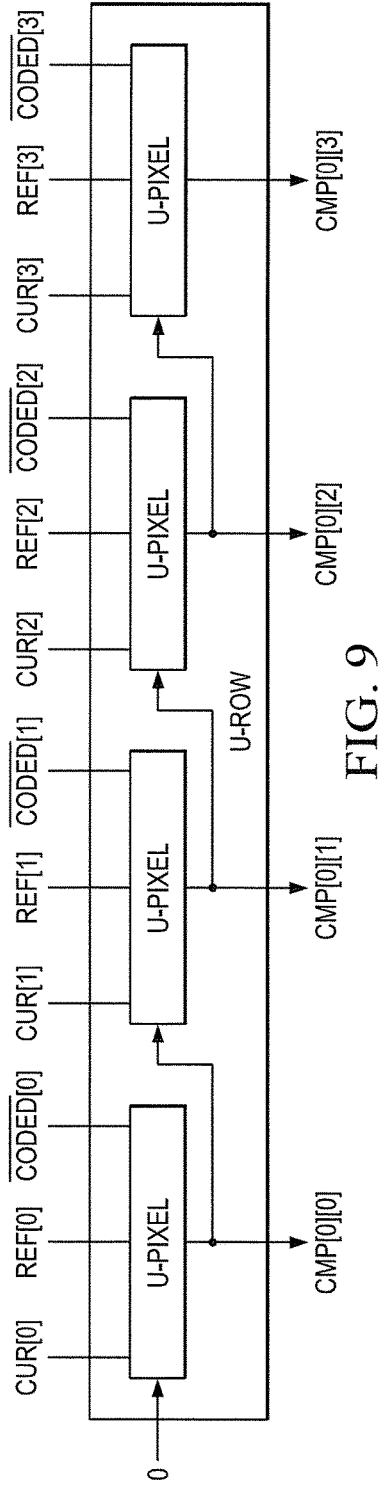
FIG. 9 illustrates a U_ROW module.

The first step is to process each row in parallel. Each pixel in one row of the rectangle is assigned to one U_PIXEL block; this processing unit is called U_ROW. An example of the processing unit for the first row is shown in FIG. 9.

Figure 10:
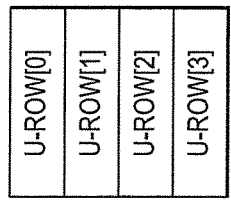
FIG. 10 illustrates a U_CMP module.

4 U_ROW units are needed to process this 4×4 block, as shown in FIG. 10. Its output is an array of cmp[4] [4].

The next step is to process each column of the cmp array in parallel. Each cmp in a column of the cmp array is processed by processing unit U_COL, as shown in FIG. 11.

4 U_COL units are needed to process this 4×4 block. Its output is an array of rw[4] [4] as shown in FIG. 12.

The number of zeros in each row of rw[n] [0-3] is then counted and the 4 results are recorded to array r_width[n]. It is noted r_width[n] equals to rwidth[n] in step #7. l_width [n] is generated in the same fashion. The min width array in step #7 can be obtained as {{l_width[1], r_width[1]}, {l_width[2], r_width[2]}, {l_width[3], r_width[3]} . . . }

This hardware architecture can be modified to fit in the parallel processing framework of any modern CPU/DSP/GPU. A simplified pseudo-code for fast software implementation is listed below.

```
// 1. Generate array C[ ][ ]
For(y = 0; y < height; ++y)
{
    For(x = 0; x < width; ++x)
    {
        tmp1 = cur_pixel ^ ref_pixel;
        tmp2 = tmp1[0] | tmp1[1] | tmp1[2] | tmp1[3] |
tmp1[4] | tmp1[5] | tmp1[6] | tmp1[7];
        C[y][x] = tmp2 & (!coded[y][x]);
    }
}
// 2. Generate array CMP[ ][ ]
For(y = 0; y < height; ++y)
{
    CMP[y][0] = C[y][0];
}
For(x = 1; x < width; ++x)
{
    For(y = 0; y < height; ++y)
    {
        CMP[y][x] = C[y][x] | CMP[y][x-1];
    }
}
// 3. Generate array RW[ ][ ] or LW[ ][ ]
For(x = 0; x < width; ++x)
{
    RW[0][x] = CMP[0][x];
}
For(y = 1; y < height; ++y)
{
    For(x = 0; x < width; ++x)
    {
        RW[y][x] = CMP[y][x] | RW[y-1][x];
    }
}
// 4. Convert RW[ ][ ] to R_WIDTH[ ]
For(y = 0; y < height; ++y)
{
    // count zero, or leading zero detection
    R_WIDTH[y] = LZD(RW[y][0], RW[y][1], RW[y][2], RW[y][3]);
}
```

There is no data dependence in each loop, so a traditional software parallel processing method, such as loop unrolling, MMX/SSE, can be applied to increase the execution speed.

This method can also apply to a 1D search if the number of rows is limited to one. A simplified pseudo-code for fast software implementation of fix length based 1D search is listed below.

```
// 1. Generate array C[ ]
For(x = 0; x < width; ++x)
{
    tmp1 = cur_pixel ^ ref_pixel;
    tmp2 = tmp1[0] | tmp1[1] | tmp1[2] | tmp1[3] | tmp1[4] |
tmp1[5] | tmp1[6] | tmp1[7];
    C[x] = tmp2 & (!coded[x]);
}
// 2. Generate array RW[ ] or LW[ ]
If (last "OR" operation in U_PIXEL module is removed)
    Assign RW[ ] = C[ ]
Else {
    RW [0] = C[0];
    For(x = 1; x < width; ++x)
    {
        RW [x] = C[x] RW [x-1]
    }
}
// 3. Convert RW[ ][ ] to R_WIDTH[ ]
// count zero, or leading zero detection
If(last "OR" operation in U_PIXEL module is removed)
    R_WIDTH = LZD(RW[0], RW[1], RW[2], RW[3]);
Else
    R_WIDTH[y] = COUNT_ZERO(RW[0], RW[1], RW[2], RW[3]);
```

After both 1D match and 2D match is completed, max (1d length, 2d (width×height)) is chosen as the winner. If the lwidth of 2D match is non-zero, the length of the prior 1D match (length=length−lwidth) needs to be adjusted to avoid the overlap between prior 1D match and current 2D match. If the length of the prior 1D match becomes zero after adjustment, it is removed from the match list.

The next starting location is calculated using current_location+length if the previous match is a 1D match, or current_location+(lwidth+rwidth) if the previous match is a 2D match. When a 1D match is performed, if any to-be-matched-pixel falls into any previous 2D match region where its location has already been covered by a 2D match, the next pixels will be scanned through until a pixel location is found where it has not been coded by previous match.

After obtaining these matched pairs, an entropy engine is applied to convert these symbols into the binary stream. Exemplified here is the idea of using the equal probability context mode. An advanced adaptive context mode could be applied as well for better compression efficiency.

```
// loop for each CU, uiTotal=uiwidth*uiHeight, uiIdx=0;
while ( uiIdx < uiTotal) {
    // *pDist: store the distance value for each matched
pair
    // *pIdx: store the index value for each matched pair
    // *pLen: store the length value for each matched pair
    // encodeEP( ) and encodeEPs( ) are reusing HEVC or
similar by-pass entropy coding.
    if (pDist[uiIdx] == −1 )
    {
        //encode one-bin with equal-probability model to
indicate the
        //whether current pair is matched or not.
        unmatchedPairFlag = TRUE;
        encodeEP(unmatchedPairFlag);
        //uiIndexBits is controlled by the color table size
        // i.e., for 24 different colors, we need 5 bits,
for 8 colors, 3 bits
        encodeEPs(pIdx[uiIdx], uiIndexBits);
        uiIdx++;
    }
    else
    {
        unmatchedPairFlag= FALSE;
        encodeEP(unmatchedPairFlag);
        /*bound binarization with max possible value*/
        UInt uiDistBits =0;
        // offset is used to add additional references from
neighboring blocks
        // here, we first let offset=0;
        while( (1<<uiDistBits)<= (uiIdx+offset))
        {
```

-continued

```
        uiDistBits++;
    }
    encodeEPs(pDist[uiIdx], uiDistBits);
    /*bound binarization with max possible value*/
    UInt uiLenBits =0;
    while( (1<<uiLenBits)<= (uiTotal-uiIdx))
    {
        uiLenBits++;
    }
    encodeEPs(pLen[uiIdx], uiLenBits);
    uiIdx += pLen[uiIdx];
    }
}
```

Shown is the encoding procedure for each matched pair. Correspondingly, the decoding process for the matched pair is as follows.

```
// loop for each CU, uiTotal=uiWidth*uiHeight, uiIdx=0;
while ( uiIdx < uiTotal) {
    // *pDist: store the distance value for each matched
pair
    // *pIdx: store the index value for each matched pair
    // *pLen: store the length value for each matched pair
    // parseEP( ) and parseEPs( ) are reusing HEVC or similar
by-pass entropy coding.
    // parse the unmatched pair flag
    parseEP(&uiUnmatchedPairFlag);
    if (uiUnmatchedPairFlag )
    {
        parseEPs( uiSymbol, uiIndexBits );
        pIdx[uiIdx] = uiSymbol;
        uiIdx++;
    }
    else
    {
        /*bound binarization with max possible value*/
        UInt uiDistBits =0;
        // offset is used to add additional references from
neighboring blocks
        // here, we first let offset=0;
        while( (1<<uiDistBits)<= (uiIdx+offset))
            uiDistBits++;
        UInt uiLenBits =0;
        while( (1<<uiLenBits)<= (uiTotal-uiIdx))
            uiLenBits++;
        parseEPs( uiSymbol, uiDistBits);
        pDist[uiIdx] = uiSymbol;
        parseEPs( uiSymbol, uiLenBits);
        pLen[uiIdx] = uiSymbol;
        for(UInt i=0; i< pLen[uiIdx]; i++)
            pIdx[i+uiIdx] = pIdx[i+uiIdx- pDist[uiIdx]];
        uiIdx += pLen[uiIdx];
    }
}
```

Note that only pixels in an unmatched position are encoded into a bit stream. To have a more accurate statistics modal, use only these pixels and their neighbors for Color palette table Derivation, instead of using all pixels in this CU.

For these index or delta output, they usually contain limited number of unique value under certain encoding mode. This disclosure introduces a second delta palette table to utilize this observation. This delta palette table can be built after all literal data are obtained in this CU, it will be signaled explicitly in the bit stream. Alternatively, it can be built adaptively during the coding process, so that the table does not have to be included in the bit stream. A delta_color_table_adaptive_flag is defined for this choice.

Another advanced scheme is provided, called Neighboring Delta Color palette table Merge. For adaptive delta palette generation, an encoder can use a delta palette from top or left CU as the initial starting point. For non-adaptive palette generation, the encoder can also use a delta palette from top or left CU and compare the RD cost among top, left and current CU.

A delta_color_table_merge_flag is defined to indicate whether a current CU uses the delta color palette table from its left or upper CU. A current CU carries the delta color palette table signaling explicitly only when delta_color_table_adaptive_flag==0 and delta_color_table_merge_flag==0 at the same time.

For a merging process, if delta_color_table_merge_flag is asserted, another delta_color_table_merge_direction is defined to indicate whether the merge candidate is from either upper or left CU.

An example of an encoding process for an adaptive delta palette generation is shown as follows. At a decoding side, whenever a decoder receives a literal data, it regenerates a delta palette based on reverse steps.

10. Define palette_table[ ] and palette_count[ ]
11. Initialize palette_table(n)=n (n=0 . . . 255), alternatively, it can use palette_table[ ] from top or left CU as initial value
12. Initialize palette_count(n)=0 (n=0 . . . 255), alternatively, it can use palette_count[ ] from top or left CU as initial value
13. For any delta value c':
   1) Locate n so that palette_table(n)==delta c'
   2) Use n as the new index of delta c'
   3) ++palette_count(n)
   4) Sort palette_count[ ] so that it is in descendent order
   5) Sort palette_table[ ] accordingly
14. Go back to step 1 until all delta c' in current LCU are processed For any block that includes both text and graphics, a mask flag is used to separate the text section and graphics section. The text section is compressed by the above described method; the graphics section is compressed by another compression method.

Note that because the value of any pixel covered by the mask flag has been coded by a text layer losslessly, these pixels in graphics section can be as "don't-care-pixel". When the graphics section is compressed, any arbitrary value can be assigned to a don't-care-pixel in order to obtain optimal compression efficiency.

Since the lossy part could be handled by the color palette table derivation, the index map has to be compressed losslessly. This allows the efficient processing using a 1D or a 2D string match. For this disclosure, the or the 2D string match is constrained at current LCU, but the search window can extend beyond the current LCU. Also note that the matched distance can be encoded using a pair of motion vectors in horizontal and vertical directions, i.e., (MVx=matched_distance/cuWidth, MVy=matched_distance−cuWidth*MVx).

Given that image would have a different spatial texture orientation at local regions, the 1D search can be allowed in either horizontal or vertical directions by defining the color_idx_map_pred direction indicator. The optimal index scanning direction can be made based on the R-D cost. FIG. 6 shows the scanning directions, starting from the very first position. Further illustrated is the horizontal and vertical scanning pattern in FIG. 9. Consider an 8×8 CU as an example. The deriveMatchPairs( ) and associated entropy coding steps are performed twice for both the horizontal and the vertical scanning pattern. Then, the final scanning direction is chosen with the smallest RD cost.

Improved Binarization

As shown in FIG. 13, the color palette table and a pair of matched information for the color index map are encoded. They are encoded using fixed length binarization. Alternatively, variable-length binarization can be used.

For example, as for the color palette table encoding, the table can have 8 different color values. Therefore, it only contains 8 different indices in the color index map. Instead of using fixed 3 bins to encode every index value equally, just one bit can be used to represent the background pixel, for instance 0. Then, the rest of 7 pixel values use a fixed-length codeword, such as 1000, 1001, 1010, 1011, 1100, 1101, and 1110 to encode the color index. This is based on the fact that the background color may occupy the largest percentile and therefore a special codeword for it saves the total bins. This scenario happens commonly for screen content. Consider a 16×16 CU, for fixed 3-bin binarization, it requires 3×16×16=768 bins. Also, let 0 index be background color, occupying 40%, while other colors are equally distributed. In this case, it only requires 2.8×16× 16<768 bins.

For the matched pair encoding, the max value can be used to bound its binarization, given the constrained implementation of this approach within the area of the current CU. Mathematically, the matched distance and length could be as long as 64×64=4K in each case. However, this wouldn't be happening jointly. For every matched position, the matched distance is bounded by the distance between current position and the very first position in the reference buffer (such as the first position in current CU as an example), for instance L. Therefore, the maximum bins for this distance binarization is log 2(L)+1 (instead of fixed length), and the maximum bins for the length binarization is log 2(cuSize−L)+1 with cuSize=cuWidth*cuHeight.

In addition to the color palette table and index map, the residual coding could be significantly improved by a different binarization method. As for HEVC RExt and HEVC version, transform coefficient is binarization using the variable length codes at the assumption that the residual magnitude should be small after prediction, transform and quantization. However, after introducing the transform skip, especially for the transform skip on the screen content with distinct color, there commonly exists residuals with larger and random value (not close to "1", "2", "0" relative smaller value). If the current HEVC coefficients binarization are used, it turns out to yield a very long code word. Alternatively, using the fixed length binarization saves the code length for the residuals produced by the color palette table and index coding mode.

Adaptive Chroma Sampling for Mixed Content

The foregoing provides various techniques for high-efficiency screen content coding under the framework of the HEVC/HEVC-RExt. In practice, in addition to pure screen content (such as text, graphics) or pure natural video, there is also content containing both screen material and camera-captured natural video—called mixed content. Currently, mixed content is treated with 4:4:4 chroma sampling. However, for the embedded camera-captured natural video portion in such mixed content, the 4:2:0 chroma sampling may be sufficient to provide perceptual lossless quality. This is due to the fact that the human vision system is less sensitive to the spatial changes in chroma components compared with that from the luma components. Hence, sub-sampling typically is performed on the chroma part (e.g., the popular 4:2:0 video format) to achieve noticeable bit rate reduction while maintaining same reconstructed quality.

The present disclosure provides a new flag (i.e., enable_chroma_subsampling) that is defined and signaled at the CU level recursively. For each CU, the encoder determines whether it is being coded using 4:2:0 or 4:4:4 according to the rate-distortion cost.

Figure 14A:
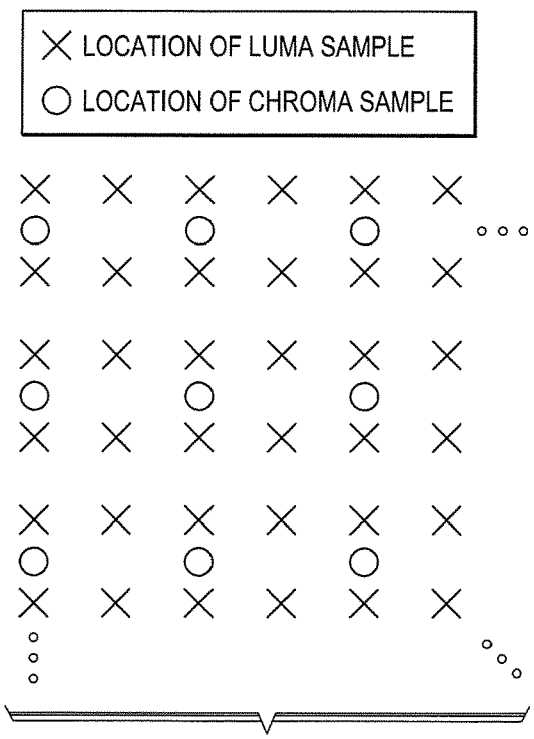
FIG. 14A is an illustration of a 4:2:0 chroma sampling format.
Figure 14B:
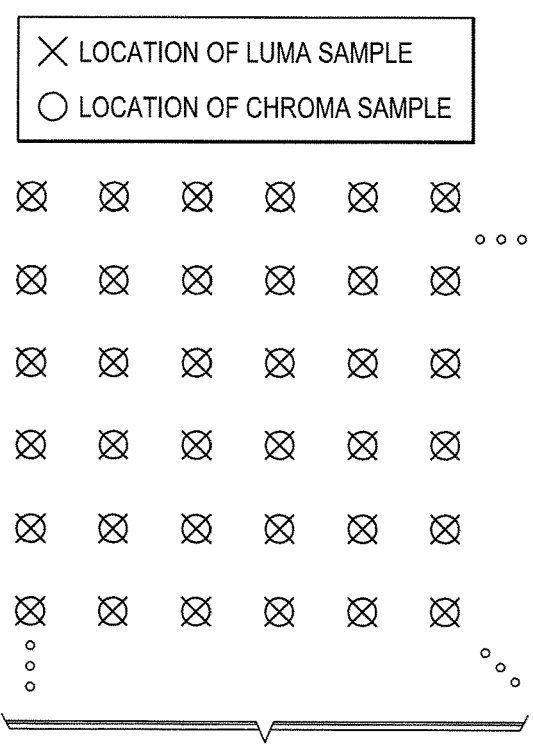
FIG. 14B is an illustration of a 4:4:4 chroma sampling format.

Shown in FIG. 14A and FIG. 14B are the 4:2:0 and 4:4:4 chroma sampling formats.

At the encoder side, for each CU, assuming the input is 4:4:4 source shown above, the rate-distortion cost is derived directly using the 4:4:4 encoding procedure with enable_chroma_subsampling=0 or FALSE. Then, the process sub-samples 4:4:4 samples to 4:2:0 to derive its bit consumption. The reconstructed 4:2:0 format is interpolated back to the 4:4:4 format for distortion measurement (using SSE/SAD). Together with the bit consumption, the rate-distortion cost is derived when encoding the CU at 4:2:0 space and comparing it with the cost when encoding the CU at 4:4:4. Whichever encoding gives the less rate-distortion cost will be chosen for the final encoding.

Figure 15:
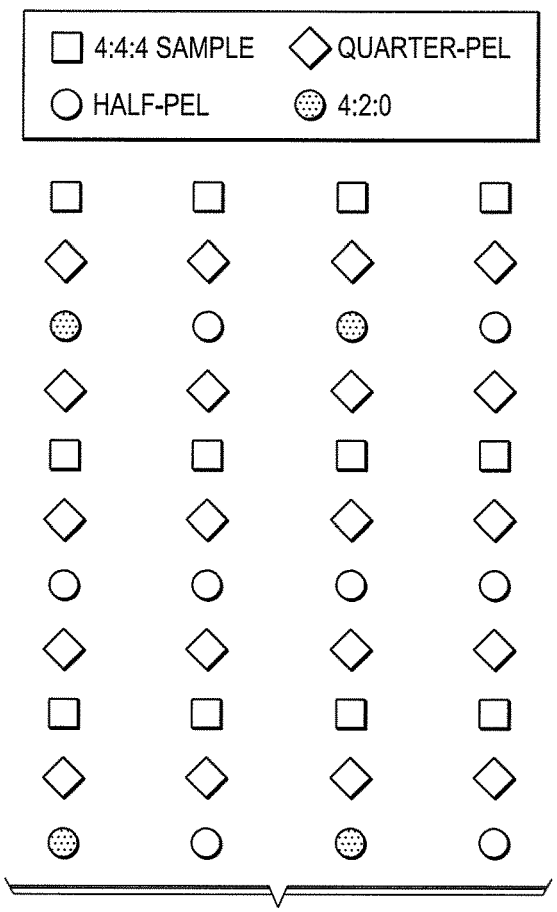
FIG. 15 illustrates an interpolation between 4:20 and 4:4:4.

Illustrated in FIG. 15 is the interpolation process from 4:4:4 to 4:2:0 and vice versa. Usually this video color sampling format conversion process requires a large number of interpolation filters.

To reduce the implementation complexity, an HEVC interpolation filter (i.e., DCT-IF) may be utilized. As shown in FIG. 15, the "squared box" represents the original 4:4:4 samples. From 4:4:4 to 4:2:0, the half-pel pixels ("circle") are interpolated using DCT-IF vertically for the chroma components. Also shown are the quarter-pel positions ("diamond") for illustration purposes. The grey shaded "circles" are picked to form the 4:2:0 samples. For the interpolation from 4:2:0 to 4:4:4, the process starts with the grey "circles" in the chroma components, the half-pel positions are interpolated horizontally to obtain all "circles," and then the "squared box" are interpolated using DCT-IF vertically. All the interpolated "squared box" are chosen to form the reconstructed 4:4:4 source.

Encoder Control

As discussed in the previous sections, disclosed are flags to control the low-level processing. For instance, enable_packed_component_flag is used to indicate whether current CU uses its packed format or conventional planar format for encoding the processing. Whether to enable a packed format could depend on the R-D cost calculated at the encoder. For a practical encoder implementation, a low-complexity solution is achieved by analyzing the histogram of the CU and finding the best threshold for the decision, as shown in FIG. 3.

The size of the color palette table has a direct impact on the complexity. maxColorNum is introduced to control the trade-off between complexity and coding efficiency. The most straightforward way is choosing the one yielding the least R-D cost.

Index map encoding direction could be determined by the R-D optimization, or using the local spatial orientation (such as sobel operator based direction estimation).

Figure 16:
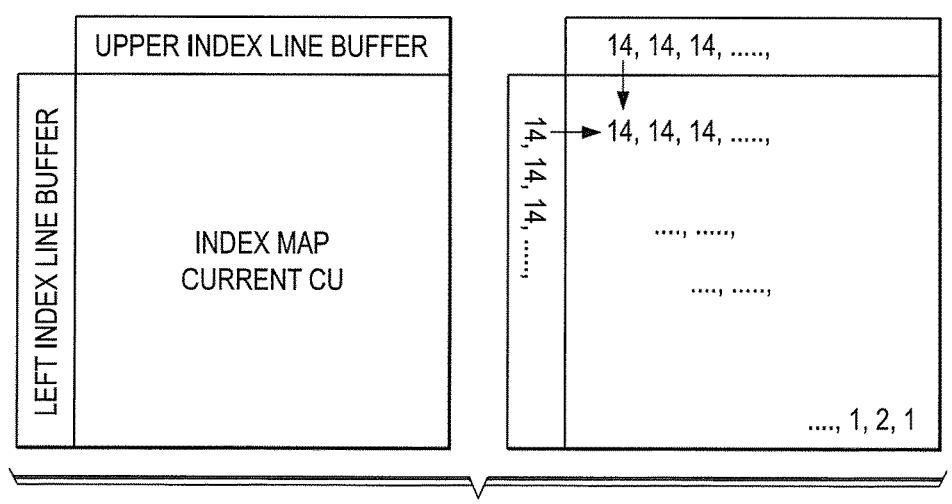
FIG. 16 illustrates Index Map processing with Upper/Left line buffer.

This disclosure limits the processing within every CTU/CU. In practice, this constraint can be relaxed. For example, for a color index map processing, the line buffer from its upper and left CU can be used, as shown in the FIG. 16. With an upper and a left buffer, the search can be extended to further improve the coding efficiency. Given that upper/left buffers are formed using the reconstructed pixels from neighboring CUs, these pixels (as well as its corresponding indices) are available for reference before processing current CU index map. For instance, after re-ordering, the current CU index map could be 14, 14, 14, . . . 1, 2, 1 (as 1D presentation). Without a line buffer reference, the first "14" will be coded as an unmatched pair. However, with a neighboring line buffer, the string match can start at the very first pixel, as shown below (horizontal and vertical scanning patterns are shown as well).

Decoder Syntax

The following information can be used to describe the decoder shown in FIG. 2. The syntax of this disclosure is aligned with a committee draft of HEVC RExt.

7.3.5.8 Coding Unit Syntax:

|  | Descriptor |
|---|---|
| coding_unit ( x0, y0, log2CbSize ) { | |
| if( transquant_bypass_enabled_flag ) | |
|   cu_transquant_bypass_flag | ae(v) |
| if( slice_type != I ) | |
|   cu_skip_flag[ x0 ][ y0 ] | ae(v) |
| nCbS = ( 1 << log2CbSize ) | |
| if( cu_skip_flag[ x0 ][ y0 ] ) | |
|   prediction_ unit( x0, y0, nCbS, nCbS ) | |
| else { | |
|   if( intra_block_copy_enabled_flag ) | |
|     intra _bc_flag[ x0 ][ y0 ] | ae(v) |
|   if( color_table_enabled_flag ) | |
|     color_table_flag[ x0 ][ y0 ] | ae(v) |
|   if( delta_color_table_enabled_flag ) | |
|     delta_ color_table_flag[ x0 ][ y0 ] | ae(v) |
|   if( !intra_bc_flag[ x0 ][ y0 ] ) { | |
|     if( slice_type != I ) | |
|       pred_mode_flag | ae(v) |
|   if( CuPredMode[ x0 ][ y0 ] != MODE_INTRA | | | |
|     log2CbSize = = MinCbLog2SizeY ) | |
|     part_mode | ae(v) |
|   } | |
|   if( CuPredMode[ x0 ][ y0 ] = = MODE_ INTRA ) { | |
|     if( PartMode = = PART_2Nx2N && pcm_enabled_flag && !intra_bc_flag | |
|       log2CbSize >= Log2MinIpcmCbSizeY && | |
|       log2CbSize <= Log2MaxIpcmCbSizeY ) | |
|       pcm_flag[ x0 ][ y0 ] | ae(v) |
|     if( pcm_flag[ x0 ][ y0 ] ) { | |
|       while( !byte_aligned( ) ) | |
|         pcm_alignment_zero_bit | f(1) |
|       pcm_sample( x0, y0, log2CbSize ) | |
|   } else if( intra_bc_flag[ x0 ][ y0 ] ) { | |
|     mvd_coding( x0, y0, 2) | |
|   } else if( color_table_flag[x0][y0] | | delta_color_table_flag [x0][y0]) { | |
|     enable_packed_component_flag | ae(v) |
|     if (color_ table_ flag [x0][y0] ) { | |
|       color_table_merge_flag | ae(v) |
|       if (color_table_merge_flag) { | |
|         color_table_merge_idx | ae(v) |
|       }else{ | |
|         color_table_size | ae(v) |
|         for(i=0;i< color_table_size;i++) | |
|           color_ table _entry[i] | ae(v) |
|       } | |
|       color_idx_map_pred_direction | ae(v) |
|     } | |
|     if (delta_color_table_flag [x0][y0] ) { | |
|       delta_color_table_adaptive_flag | ae(v) |
|       delta_color_table_merge_flag | ae(v) |
|       if (delta_color_table_merge_flag) { | |
|         delta_color_table_merge_idx | ae(v) |
|       }else if (!delta_color_table_adaptive_flag){ | |
|         delta_color_table_size | ae(v) |
|         for(i=0;i< delta_color_able_size;i++) | |
|           delta_color_table_entry[i] | ae(v) |
|       } | |
|     } | |
|     Pos=0; cuWidth=1<<log2CbSize; | |

-continued

|  | Descriptor |
|---|---|
|     cuHeight=1<<log2CbSize; | |
|     while (Pos<cuWidth*cuHeight) { | |
|       matched_flag | ae(v) |
|       if (matched_flag ) { | |
|         matched_distance /*MVx, MVy*/ | ae(v) |
|         matched_length | ae(v) |
|       }else{ | |
|         index_delta | ae(v) |
|       } | |
|     } | |
|   } else { | |
| ... . .pbOffset = ( PartMode = = PART_NxN ) | |
| ? ( nCbS / 2 ) : nCbS | |
| ... . | |

Figure 17:
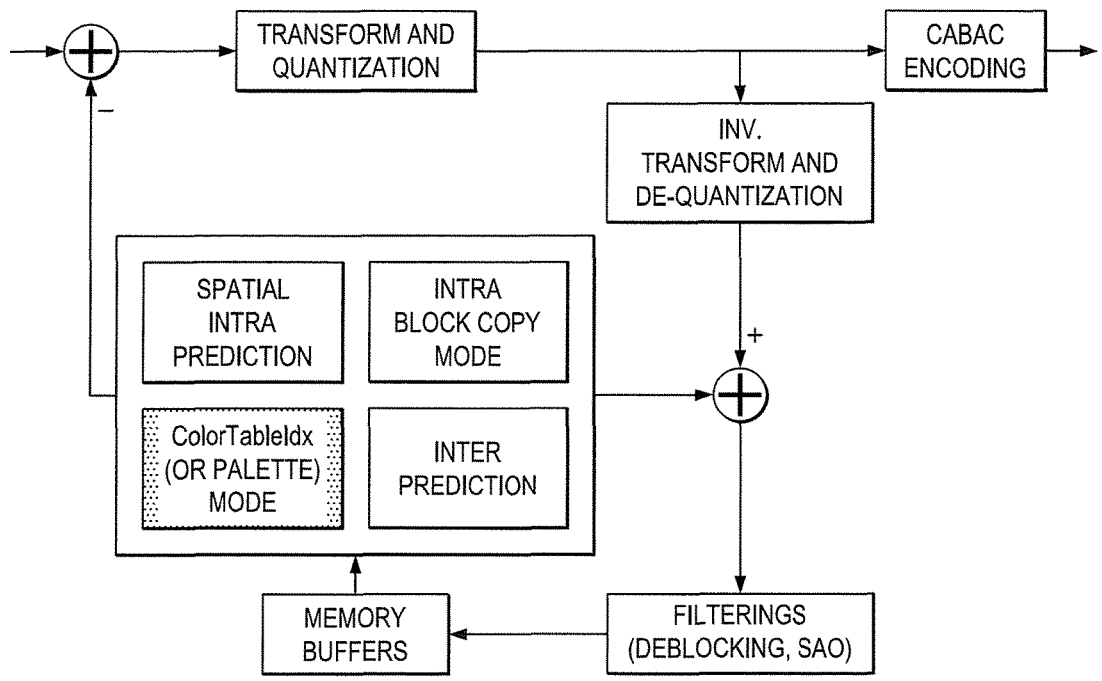
FIG. 17 illustrates the apparatus and methods/flows incorporated into the current HEVC.

FIG. 17 illustrates the apparatus and methods/flows incorporated into the current HEVC.

Figure 18:
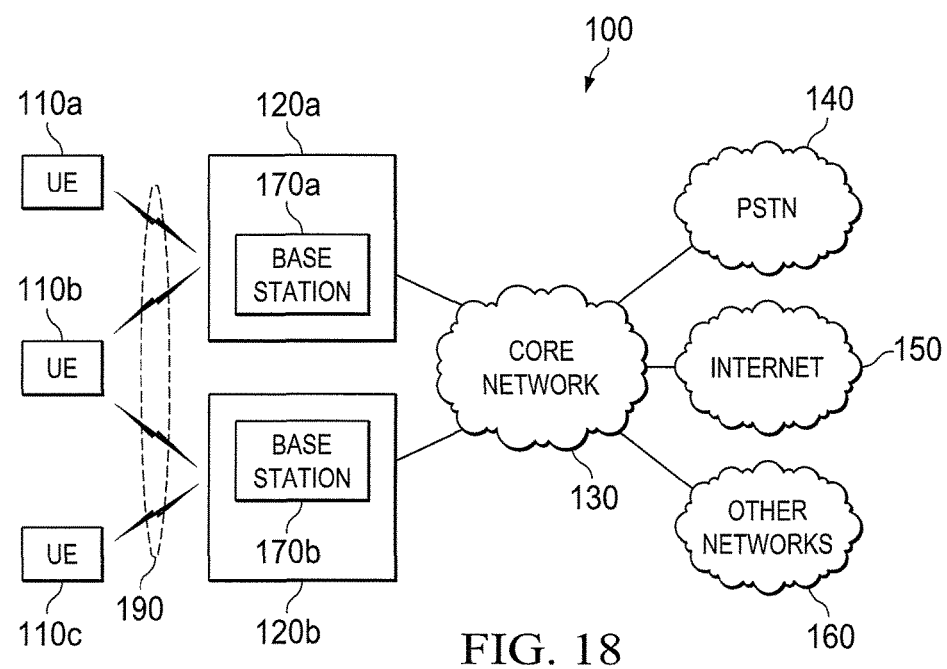
FIG. 18 illustrates one example of a communication system.

The above identified methods/flows and devices may be incorporated into a wireless or wired, or combination thereof, communications network and implemented in devices, such as that described below, and in the drawings below:

FIG. 18 illustrates an example communication system 100 that uses signaling to support advanced wireless receivers according to this disclosure. In general, the system 100 enables multiple wireless users to transmit and receive data and other content. The system 100 may implement one or more channel access methods, such as code division multiple access (CDMA), time division multiple access (TDMA), frequency division multiple access (FDMA), orthogonal FDMA (OFDMA), or single-carrier FDMA (SC-FDMA).

In this example, the communication system 100 includes user equipment (UE) 110a-110c, radio access networks (RANs) 120a-120b, a core network 130, a public switched telephone network (PSTN) 140, the Internet 150, and other networks 160. While certain numbers of these components or elements are shown in FIG. 18, any number of these components or elements may be included in the system 100.

The UEs 110a-110c are configured to operate and/or communicate in the system 100. For example, the UEs 110a-110c are configured to transmit and/or receive wireless signals or wired signals. Each UE 110a-110c represents any suitable end user device and may include such devices (or may be referred to) as a user equipment/device (UE), wireless transmit/receive unit (WTRU), mobile station, fixed or mobile subscriber unit, pager, cellular telephone, personal digital assistant (PDA), smartphone, laptop, computer, touchpad, wireless sensor, or consumer electronics device.

The RANs 120a-120b here include base stations 170a-170b, respectively. Each base station 170a-170b is configured to wirelessly interface with one or more of the UEs 110a-110c to enable access to the core network 130, the PSTN 140, the Internet 150, and/or the other networks 160. For example, the base stations 170a-170b may include (or be) one or more of several well-known devices, such as a base transceiver station (BTS), a Node-B (NodeB), an evolved NodeB (eNodeB), a Home NodeB, a Home eNodeB, a site controller, an access point (AP), or a wireless router, or a server, router, switch, or other processing entity with a wired or wireless network.

In the embodiment shown in FIG. 18, the base station 170a forms part of the RAN 120a, which may include other base stations, elements, and/or devices. Also, the base station 170b forms part of the RAN 120b, which may include other base stations, elements, and/or devices. Each base station 170a-170b operates to transmit and/or receive wireless signals within a particular geographic region or area, sometimes referred to as a "cell." In some embodiments, multiple-input multiple-output (MIMO) technology may be employed having multiple transceivers for each cell.

The base stations 170a-170b communicate with one or more of the UEs 110a-110c over one or more air interfaces 190 using wireless communication links. The air interfaces 190 may utilize any suitable radio access technology.

It is contemplated that the system 100 may use multiple channel access functionality, including such schemes as described above. In particular embodiments, the base stations and UEs implement LTE, LTE-A, and/or LTE-B. Of course, other multiple access schemes and wireless protocols may be utilized.

The RANs 120a-120b are in communication with the core network 130 to provide the UEs 110a-110c with voice, data, application, Voice over Internet Protocol (VoIP), or other services. Understandably, the RANs 120a-120b and/or the core network 130 may be in direct or indirect communication with one or more other RANs (not shown). The core network 130 may also serve as a gateway access for other networks (such as PSTN 140, Internet 150, and other networks 160). In addition, some or all of the UEs 110a-110c may include functionality for communicating with different wireless networks over different wireless links using different wireless technologies and/or protocols.

Although FIG. 18 illustrates one example of a communication system, various changes may be made to FIG. 18. For example, the communication system 100 could include any number of UEs, base stations, networks, or other components in any suitable configuration, and can further include the EPC illustrated in any of the figures herein.

Figure 19A:
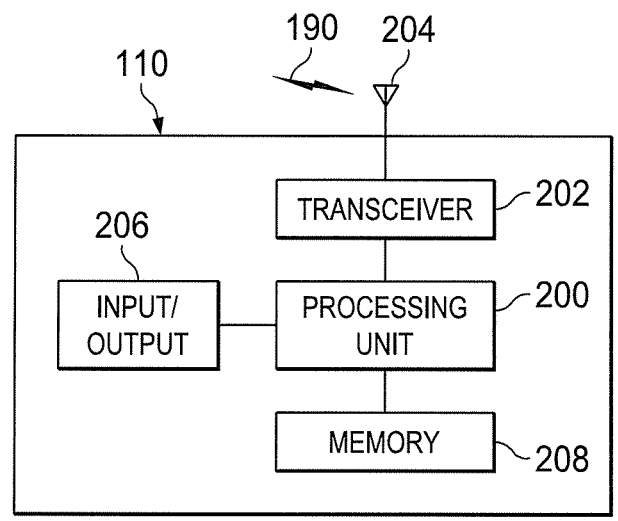
FIG. 19A and FIG. 19B illustrate example devices that may implement the methods and teachings according to this disclosure.
Figure 19B:
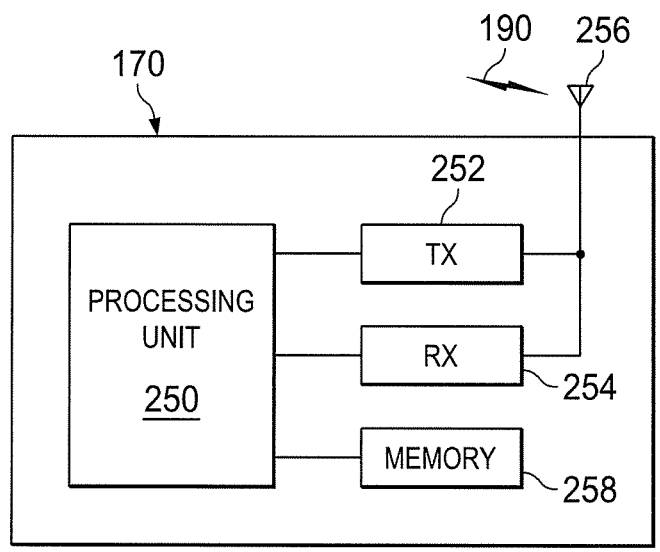

FIGS. 19A and 19B illustrate example devices that may implement the methods and teachings according to this disclosure. In particular, FIG. 19A illustrates an example UE 110, and FIG. 19B illustrates an example base station 170. These components could be used in the system 100 or in any other suitable system.

As shown in FIG. 19A, the UE 110 includes at least one processing unit 200. The processing unit 200 implements various processing operations of the UE 110. For example, the processing unit 200 could perform signal coding, data processing, power control, input/output processing, or any other functionality enabling the UE 110 to operate in the system 100. The processing unit 200 also supports the methods and teachings described in more detail above. Each processing unit 200 includes any suitable processing or computing device configured to perform one or more operations. Each processing unit 200 could, for example, include a microprocessor, microcontroller, digital signal processor, field programmable gate array, or application specific integrated circuit.

The UE 110 also includes at least one transceiver 202. The transceiver 202 is configured to modulate data or other content for transmission by at least one antenna 204. The transceiver 202 is also configured to demodulate data or other content received by the at least one antenna 204. Each transceiver 202 includes any suitable structure for generating signals for wireless transmission and/or processing signals received wirelessly. Each antenna 204 includes any suitable structure for transmitting and/or receiving wireless signals. One or multiple transceivers 202 could be used in the UE 110, and one or multiple antennas 204 could be used in the UE 110. Although shown as a single functional unit, a transceiver 202 could also be implemented using at least one transmitter and at least one separate receiver.

The UE 110 further includes one or more input/output devices 206. The input/output devices 206 facilitate interaction with a user. Each input/output device 206 includes any suitable structure for providing information to or receiving information from a user, such as a speaker, microphone, keypad, keyboard, display, or touch screen.

In addition, the UE 110 includes at least one memory 208. The memory 208 stores instructions and data used, generated, or collected by the UE 110. For example, the memory 208 could store software or firmware instructions executed by the processing unit(s) 200 and data used to reduce or eliminate interference in incoming signals. Each memory 208 includes any suitable volatile and/or non-volatile storage and retrieval device(s). Any suitable type of memory may be used, such as random access memory (RAM), read only memory (ROM), hard disk, optical disc, subscriber identity module (SIM) card, memory stick, secure digital (SD) memory card, and the like.

As shown in FIG. 19B, the base station 170 includes at least one processing unit 250, at least one transmitter 252, at least one receiver 254, one or more antennas 256, and at least one memory 258. The processing unit 250 implements various processing operations of the base station 170, such as signal coding, data processing, power control, input/output processing, or any other functionality. The processing unit 250 can also support the methods and teachings described in more detail above. Each processing unit 250 includes any suitable processing or computing device configured to perform one or more operations. Each processing unit 250 could, for example, include a microprocessor, microcontroller, digital signal processor, field programmable gate array, or application specific integrated circuit.

Each transmitter 252 includes any suitable structure for generating signals for wireless transmission to one or more UEs or other devices. Each receiver 254 includes any suitable structure for processing signals received wirelessly from one or more UEs or other devices. Although shown as separate components, at least one transmitter 252 and at least one receiver 254 could be combined into a transceiver. Each antenna 256 includes any suitable structure for transmitting and/or receiving wireless signals. While a common antenna 256 is shown here as being coupled to both the transmitter 252 and the receiver 254, one or more antennas 256 could be coupled to the transmitter(s) 252, and one or more separate antennas 256 could be coupled to the receiver(s) 254. Each memory 258 includes any suitable volatile and/or non-volatile storage and retrieval device(s).

Additional details regarding UEs 110 and base stations 170 are known to those of skill in the art. As such, these details are omitted here for clarity.

It may be advantageous to set forth definitions of certain words and phrases used throughout this patent document. The terms "include" and "comprise," as well as derivatives thereof, mean inclusion without limitation. The term "or" is inclusive, meaning and/or. The phrases "associated with" and "associated therewith," as well as derivatives thereof, mean to include, be included within, interconnect with, contain, be contained within, connect to or with, couple to or with, be communicable with, cooperate with, interleave, juxtapose, be proximate to, be bound to or with, have, have a property of, or the like.

While this disclosure has described certain embodiments and generally associated methods, alterations and permutations of these embodiments and methods will be apparent to those skilled in the art. Accordingly, the above description of example embodiments does not define or constrain this disclosure. Other changes, substitutions, and alterations are also possible without departing from the spirit and scope of this disclosure, as defined by the following claims.

What is claimed is:

1. A method for coding screen content into a bitstream, the method comprising:
   dividing the screen content into a plurality of coding units (CUs), wherein each CU comprises a plurality of pixels and wherein each pixel has a numerical value;
   creating a color palette table for a first coding unit (CU) of the plurality of CUs, wherein the color palette table comprises a plurality of entries, and wherein the plurality of entries indicate the most frequent numerical values of the plurality of pixels in the first CU;
   creating a first color index map for the first CU, the first color index map comprising an entry for each pixel in the first CU, wherein each entry in the first color index map comprises an index into the color palette table;
   creating a second color index map for a second CU of the plurality of CUs, the second color index map comprising an entry for each pixel in the second CU, wherein each entry in the second color index map comprises an index into the color palette table;
   creating a first prediction residual table comprising an entry for each pixel in the first CU, wherein each entry in the first prediction residual table comprises the difference between the numerical value of the color palette table entry corresponding to the first color index map entry for that pixel and the numerical value of that pixel;
   creating a second prediction residual table comprising an entry for each pixel in the second CU, wherein each entry in the second prediction residual table comprises the difference between the numerical value of the color palette table entry corresponding to the second color index map entry for that pixel and the numerical value of that pixel; and
   encoding the color palette table, the first color index map, the second color index map, the first prediction residual table, and the second prediction residual table into the bitstream.

2. The method as specified in claim 1, wherein the method is processed using a planar color format.

3. The method as specified in claim 1, wherein the color palette table is derived from a neighboring CU using a reconstructed CU in a pixel domain.

4. The method as specified in claim 3 further comprising generating a color palette table of the neighboring CU based on available reconstructed pixels, wherein the neighboring CU has a different depth and size than the first CU.

5. The method as specified in claim 3 further comprising generating the color palette table of the neighboring CU based on available reconstructed pixels, wherein the neighboring CU has the same depth and size as the first CU.

6. The method as specified in claim 1, wherein generating the color palette table comprises creating a histogram of numerical values of the plurality of pixels in the first CU, sorting the histogram from most frequent numerical value to least frequent numerical value, and creating an entry in the color palette table for the most frequent numerical value.

7. The method of claim 6, wherein generating the first color index map comprises comparing the numerical value of each pixel in the first CU with each color palette table entry and creating an entry in the first color index map for each pixel in the first CU, wherein the entry in the first color index map corresponds to the index of the color palette table entry whose value is closest to the numerical value of that pixel, wherein generating the second color index map comprises comparing the numerical value of each pixel in the second CU with each color palette table entry and creating an entry in the second color index map for each pixel in the second CU, and wherein the entry in the second color index map corresponds to the index of the color palette table entry whose value is closest to the numerical value of that pixel.

8. The method as specified in claim 1 further comprising encoding a size of the color palette table into the bitstream.

9. The method as specified in claim 1 further comprising encoding an indicator of a spatial relationship between the first CU and the second CU within the screen content into the bitstream.

10. The method as specified in claim 1, wherein encoding the first color index map comprises performing a one-dimension string match operation, wherein the string match operation searches for matches in a single direction, and wherein a string match is signaled using matched pairs.

11. The method as specified in claim 10, wherein the string match operation is performed on a plurality of adjacent pixels using a running hash method.

12. The method as specified in claim 1, wherein the method is processed using an interleaved color format.

13. The method of claim 1, wherein generating the color palette table further comprises creating a color palette table entry for each unique numerical value found in the plurality of pixels in the first CU.

14. The method as specified in claim 1, wherein encoding the first color index map comprises performing a hybrid one-dimension string match operation, wherein encoding the second color index map comprises performing the hybrid one-dimension string match operation, wherein the hybrid one-dimension string match operation searches for matches in two directions per dimension, and wherein a string match is signaled using matched pairs.

15. The method as specified in claim 14, wherein the string match operation is performed on a rectangular block of adjacent pixels using a running hash method.

16. The method as specified in claim 1, wherein encoding the first color index map comprises performing a two-dimension string match operation, wherein encoding the second color index map comprises performing the two-dimension string match operation, wherein the two-dimension string match operation searches for matches in a single direction per dimension, and wherein a string match is signaled using matched pairs.

17. The method as specified in claim 16, wherein the string match operation is performed on a rectangular block of adjacent pixels using a running hash method.

18. The method of claim 1, wherein for a first entry in the first color index map for the first CU:
   performing a first search in a vertical direction for a first string of entries in the first color index map, wherein each entry in the first string has the same index value as the first entry;
   performing a second search in a horizontal direction for a second string of entries in the first color index map, wherein each entry in the second string has the same index value as the first entry; and
   encoding a portion of the first color index map according to the results of the first search and the second search, wherein the encoding comprises insertion, into the bitstream, of a search direction flag, an indicator of the index value of the first entry, and an indicator of the length of the string of entries in the first color index map having the same index value as the first entry.

19. The method of claim 18, wherein encoding the portion of the color index map according to the results of the first search and the second search further comprises:
- determining the rate distortion (RD) cost associated with encoding the first string; and
- determining the RD cost associated with encoding the second string,
- wherein, when the RD cost associated with encoding the first string is less than the RD cost associated with encoding the second string, the search direction flag indicates the vertical direction and the indicator of the length of the string of entries in the index map is an indicator of the length of the first string, and
- wherein, when the RD cost associated with encoding the second string is less than the RD cost associated with encoding the first string, the search direction flag indicates the horizontal direction and the indicator of the length of the string of entries in the index map is an indicator of the length of the second string.

20. A system for coding screen content into a bitstream, the system comprising:
- a memory comprising a plurality of coding units (CUs), wherein the plurality of CUs represents the screen content, wherein each CU comprises a plurality of pixels, and wherein each pixel has a numerical value; and
- a processor coupled with the memory, wherein the processor is configured to:
  - create a color palette table for a first CU of the plurality of CUs, wherein the color palette table comprises a plurality of entries, wherein the plurality of entries indicate the most frequent numerical values of the plurality of pixels in the first CU;
  - create a first color index map for the first CU, the first color index map comprising an entry for each pixel in the first CU, wherein each entry in the first color index map comprises an index into the color palette table;
  - create a second color index map for a second CU of the plurality of CUs, the second color index map comprising an entry for each pixel in the second CU, wherein each entry in the second color index map comprises an index into the color palette table;
  - create a first prediction residual table, the first prediction residual table comprising an entry for each pixel in the first CU, wherein each entry in the first prediction residual table comprises the difference between the color palette table value corresponding to the first color index map entry for that pixel and the numerical value of that pixel;
  - create a second prediction residual table, the second prediction residual table comprising an entry for each pixel in the second CU, wherein each entry in the second prediction residual table comprises the difference between the color palette table value corresponding to the second color index map entry for that pixel and the numerical value of that pixel; and
  - encode the color palette table, the first color index map, the first prediction residual table, the second prediction residual table, and the second color index map into the bitstream.

21. The system of claim 20, wherein the CUs represent the screen content using a planar color format.

22. The system of claim 20, wherein the CUs represent the screen content using an interleaved color format.

23. The system of claim 20, wherein the processor is further configured to create the color palette table by creating a histogram of numerical values of the plurality of pixels in the first CU, sorting the histogram from most frequent numerical value to least frequent numerical value, and creating an entry in the color palette table for the most frequent numerical value.

24. The system of claim 23, wherein the processor is further configured to generate the first color index map by comparing the numerical value of each pixel in the first CU with each color palette table entry and creating an entry in the first color index map for each pixel in the first CU, wherein the entry in the first color index map corresponds to the index of the color palette table entry whose value is closest to the numerical value of that pixel, wherein the processor is further configured to generate the second color index map comprises comparing the numerical value of each pixel in the second CU with each color palette table entry and creating an entry in the second color index map for each pixel in the second CU, and wherein the entry in the second color index map corresponds to the index of the color palette table entry whose value is closest to the numerical value of that pixel.

25. A method for decoding screen content from a bitstream, comprising:
- receiving the bitstream, wherein the bitstream comprises an encoded palette table, an encoded first color index map for a first coding unit (CU), an encoded second color index map for a second CU, an encoded first prediction residual table, and an encoded second prediction residual table;
- creating a first color index map from the first encoded color index map, wherein the first color index map comprises a plurality of entries, wherein each entry in the first color index map comprises an index value into a color palette table created from the encoded color palette table, and wherein creating the first color index map comprises:
  - locating an encoded string within the bitstream, wherein the encoded string is associated with a starting entry in the color index map and wherein the encoded string comprises a direction flag, an indicator of an index value of an entry in the color index map, and an indicator of the length of the string of entries in the index map having the same index value as the first entry;
  - determining a reference index value according to the indicator of the index value in the encoded string;
  - determining a string length from the indicator of the length of the string in the encoded string; and
  - repeatedly inserting the reference index value into the color index map beginning at the starting entry and continuing according to the direction flag and the string length; and
- creating a second color index map from the encoded second color index map, wherein the second color index map comprises a plurality of entries, wherein each entry in the second color index map comprises an index value into the color palette table;
- creating a first prediction residual table from the encoded first prediction residual table, the first residual prediction table comprising an entry for each pixel in the first CU, wherein each entry in the first prediction residual table comprises the difference between the numerical value of the color palette table entry corresponding to the first color index map entry for that pixel and the numerical value of that pixel;
- creating a second prediction residual table from the encoded second prediction residual table, the second prediction residual table comprising an entry for each pixel in the second CU, wherein each entry in the second prediction residual table comprises the difference between the numerical value of the color palette table entry corresponding to the second color index map entry for that pixel and the numerical value of that pixel; and creating the first CU according to the first color index map and the color palette table and the second CU according to the second color index map and the color palette table.

26. An apparatus for decoding screen content from a bitstream, comprising:

a memory configured to store a bitstream comprising an encoded palette table, an encoded first color index map for a first coding unit (CU), an encoded second color index map for a second CU, an encoded first prediction residual table, and an encoded second prediction residual table, wherein the first CU and the second CU each comprise a plurality of pixels associated with screen content; and a processor coupled with the memory, wherein the processor is configured to:

create a first color index map from the encoded first color index map, wherein the first color index map comprises a plurality of entries, wherein each entry in the first color index map comprises an index value into the color palette table;

create a second color index map from the encoded second color index map, wherein the second color index map comprises a plurality of entries, wherein each entry in the second color index map comprises an index value into the color palette table;

locate an encoded string within the bitstream, wherein the encoded string is associated with a starting entry in the color index map and wherein the encoded string comprises a direction flag, an indicator of an index value of an entry in the color index map, and an indicator of the length of the string of entries in the index map having the same index value as the first entry;

determine a reference index value according to the indicator of the index value in the encoded string;

determine a string length from the indicator of the length of the string in the encoded string;

repeatedly insert the reference index value into the color index map beginning at the starting entry and continuing according to the direction flag and the string length;

create a first prediction residual table from the encoded first prediction residual table, the first residual prediction table comprising an entry for each pixel in the first CU, wherein each entry in the first prediction residual table comprises the difference between the numerical value of the color palette table entry corresponding to the first color index map entry for that pixel and the numerical value of that pixel;

create a second prediction residual table from the encoded second prediction residual table, the second prediction residual table comprising an entry for each pixel in a second CU, wherein each entry in the second prediction residual table comprises the difference between the numerical value of the color palette table entry corresponding to the second color index map entry for that pixel and the numerical value of that pixel; and create the first CU according to the first color index map and the color palette table and the second CU according to the second color index map and the color palette table.

* * * * *